United States Patent
Agrawal et al.

(10) Patent No.: US 9,262,438 B2
(45) Date of Patent: Feb. 16, 2016

(54) GEOTAGGING UNSTRUCTURED TEXT

(71) Applicant: International Business Machines Corporation, Armonk, NY (US)

(72) Inventors: Dakshi Agrawal, Monsey, NY (US); Seraphin B. Calo, Cortlandt Manor, NY (US); Raghu K. Ganti, Elmsford, NY (US); Kisung Lee, Atlanta, GA (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/960,119

(22) Filed: Aug. 6, 2013

(65) Prior Publication Data

US 2015/0046452 A1 Feb. 12, 2015

(51) Int. Cl.
*G06F 17/30* (2006.01)
(52) U.S. Cl.
CPC .... *G06F 17/30241* (2013.01); *G06F 17/30705* (2013.01)
(58) Field of Classification Search
USPC ............................ 707/736–737, 748, 752–754
See application file for complete search history.

(56) References Cited

U.S. PATENT DOCUMENTS

| | | | |
|---|---|---|---|
| 8,442,969 B2 | 5/2013 | Gross | |
| 8,538,389 B1* | 9/2013 | Evans | G06Q 30/02 345/156 |
| 8,719,302 B2* | 5/2014 | Bailey et al. | 707/790 |
| 8,990,327 B2* | 3/2015 | Drews | G06F 17/30 707/778 |
| 9,002,960 B2* | 4/2015 | Drews | G06F 17/30 707/778 |
| 2007/0011150 A1* | 1/2007 | Frank | 707/4 |
| 2009/0280824 A1* | 11/2009 | Rautiainen | G01S 5/14 455/456.1 |
| 2009/0324211 A1* | 12/2009 | Strandell | G01S 5/0045 396/310 |
| 2010/0179754 A1* | 7/2010 | Faenger | G06F 17/3087 701/532 |
| 2012/0020565 A1* | 1/2012 | Urbach et al. | 382/182 |
| 2012/0166367 A1* | 6/2012 | Murdock et al. | 706/12 |
| 2012/0166412 A1* | 6/2012 | Sengamedu et al. | 707/709 |
| 2012/0191726 A1 | 7/2012 | Markus et al. | |
| 2012/0214568 A1* | 8/2012 | Herrmann | H04L 67/22 463/16 |

(Continued)

FOREIGN PATENT DOCUMENTS

EP 2307986 A0 4/2011

OTHER PUBLICATIONS

Lieberman, M. et al., "Geotagging with Local Lexicons to Build Indexes for Textually-Specified Spatial Data", 2010 IEEE 26th International Conference on Data Engineering (ICDE 2010), pp. 201-212, IEEE, 2010.

(Continued)

*Primary Examiner* — Hanh Thai
(74) *Attorney, Agent, or Firm* — Scully, Scott, Murphy & Presser, P.C.; Mercedes L. Hobson, Esq.

(57) ABSTRACT

Mechanisms are described to extract location information from unstructured text, comprising: building a language model from geo-tagged text; building a classifier for differentiating referred and physical location; given unstructured text, identifying referred location using the language model (that is, the location to which the unstructured text refers); given the unstructured text, identifying if referred location is also the physical location using the classifier; and predicting (that is, performing calculation(s) and/or estimation(s) of degree of confidence) of referred and physical location.

25 Claims, 22 Drawing Sheets

(56) References Cited

U.S. PATENT DOCUMENTS

| | | | | |
|---|---|---|---|---|
| 2012/0246054 | A1* | 9/2012 | Sastri | G06Q 50/01 705/37 |
| 2012/0303626 | A1 | 11/2012 | Friedmann et al. | |
| 2013/0024891 | A1* | 1/2013 | Elend | G06F 17/3087 725/35 |
| 2013/0110631 | A1* | 5/2013 | Mitchell | H04W 4/185 705/14.58 |
| 2014/0006408 | A1* | 1/2014 | Rae | G06F 17/278 707/740 |
| 2014/0181064 | A1* | 6/2014 | Di Cocco | G06F 17/3087 707/706 |
| 2014/0259113 | A1* | 9/2014 | Harris et al. | 726/4 |
| 2014/0358630 | A1* | 12/2014 | Bhagat et al. | 705/7.29 |
| 2015/0032510 | A1* | 1/2015 | Farahat | G06Q 30/0205 705/7.34 |
| 2015/0170296 | A1* | 6/2015 | Kautz | G06Q 10/00 705/319 |

OTHER PUBLICATIONS

Ahern, S. et al., "World Explorer: Visualizing Aggregate Data from Unstructured Text in Geo-Referenced Collections", JCDL '07, Vancouver British Columbia, Canada, Jun. 17-22, 2007.

Adams, B. et al., "On the Geo-Indicativeness of non-Georeferenced Text", Department of Computer Science and Department of Geography, University of California, Santa Barbara, CA 93010, 2012.

Anonymous, "Proximity based activity management utilizing P2P, geo-tagging and location awareness", http://priorartdatabase.com/IPCOM000207904, Jun. 16, 2011.

http://en.wikipedia.org/wiki/Stemming, "Stemming" printed Jun. 17, 2013.

http://snowball.tartarus.org/, "Snowball" printed Jun. 26, 2013.

http://web.archive.org/web/20130502121902/https://dev.twitter.com/terms/geo-developer-guidelines,"Geo Developer Guidelines" printed Aug. 9, 2013.

Chen, S. et al., "An empirical study of smoothing techniques for language modeling", ACL '96 Proceedings of the 34th annual meeting on Association for Computational Linguistics, 1996, pp. 310-318.

http://web.archive.org/web/20130115204545/https://foursquare.com/about/,"About foursquare" printed Aug. 9, 2013.

Lin, J. et al., "Smoothing Techniques for Adaptive Online Language Models: Topic Tracking in Tweet Streams", KDD'11, Aug. 21-24, 2011, San Diego, California, pp. 422-429.

Ikawa, Y. et al., "Location Inference using Microblog Messages", SWDM'12 Workshop, Apr. 16-20, 2012, Lyon, France, pp. 687-690.

Barbosa, L. et al., "Robust Sentiment Detection on Twitter from Biased and Noisy Data", Coling 2010: Poster Volume, pp. 36-44, Beijing, Aug. 2010.

http://gposttl.sourceforge.net/,"GPoSTTL" printed Aug. 9, 2013.

Mahmud, J. et al., "Where Is This Tweet From?", Proceedings of the Sixth International AAAI Conference on Weblogs and Social Media, 2012, pp. 511-514.

Amitay, E. et al., "Web-a-Where: Geotagging Web Content", SIGIR'04, Jul. 25-29, 2004, Sheffield, South Yorkshire, UK, pp. 273-280.

Noulas, A. et al., "An Empirical Study of Geographic User Activity Patterns in Foursquare", 2011.

Kavanaugh, A. et al., "Microblogging in crisis situations: Mass protests in Iran, Tunisia, Egypt", CHI 2011, May 7-12, 2011, Vancouver, Canada, pp. 1-7.

Pennacchiotti, M. et al., "Democrats, Republicans and Starbucks Afficionados: User Classification in Twitter", KDD'11, Aug. 21-24, 2011, San Diego, California, pp. 430-438.

http://gnip.com/twitter/decahose, "Gnip" printed Aug. 9, 2013.

http://www.forbes.com/sites/lisaquast/2012/12/03/twitter-a-new-age-for-customer-service/, "Twitter: A New Age for Customer Service" printed Aug. 9, 2013.

Cheng, Z et al., "Exploring Millions of Footprints in Location Sharing Services", Proceedings of the Fifth International AAAI Conference on Weblogs and Social Media, 2011, pp. 81-88.

\* cited by examiner

| tfidf THRESHOLD | # LOCAL KEYWORDS |
|---|---|
| 0.1 | 1,782 |
| 0.2 | 556 |
| 0.3 | 200 |

LOCAL KEYWORDS

FIG. 8

| tfidf THRESHOLD | # GEO-TAGGED TWEETS | PERCENTAGE |
|---|---|---|
| NO LOCAL KEYWORDS | 31,264 | 43.06% |
| 0.1 | 28,057 | 38.65% |
| 0.2 | 15,096 | 20.79% |
| 0.3 | 7,168 | 9.87% |

GEO-TAGGED TWEETS WITHOUT VALIDATION STEP

FIG. 9

| δ VALUE | # TWEETS | # $l_{ref} \neq l_{cur}$ | # $l_{ref} = l_{cur}$ |
|---|---|---|---|
| 0.5 | 2,642 | 1,936 | 706 |
| 1.0 | 1,598 | 1,008 | 590 |
| 2.0 | 1,028 | 579 | 449 |

TRAINING SETS

FIG. 12

| δ VALUE | # GEO-TAGGED TWEETS | PERCENTAGE |
|---|---|---|
| 0.5 | 2,003 | 2.76% |
| 1.0 | 2,764 | 3.81% |
| 2.0 | 3,982 | 5.48% |

EFFECTS OF DIFFERENT δ VALUES

FIG. 15

| APPROACH | PERCENTAGE |
|---|---|
| ORIGINAL TWITTER DATA | 0.72% |
| ORIGINAL TWITTER DATA (EXCLUDING FOURSQUARE & INSTAGRAM) | 0.58% |
| FRAMEWORK (WITHOUT VALIDATION STEP) | 20.79% |
| FRAMEWORK (WITH VALIDATION STEP) | 2.76% |

PERCENTAGE OF GEO-TAGGED TWEETS

FIG. 19

INFERENCE OF SPATIO-TEMPORAL TAGS FROM UNSTRUCTURED TEXT

| LOCATION | TIPS |
| --- | --- |
| NEW YORK PENN STATION | THE SEATING AREA SAYS ACELA EXPRESS TICKET HOLDERS ONLY BUT THAT'S JUST FOR MORNINGS |
| | REALLY BIG STATION, BUT THEY DON'T ANNOUNCE TEE TRAIN TRACK TILL FEW MIN BEFORE IT BOARDS. NOT A LOT OF CUSTOMER SERVICE IN THERE EITHER. |
| | INSTEAD OF WAITING ON LINE FOR YOUR AMTRAK TRAIN, TAKE THE STAIRS DIRECTLY TO THE PLATFORM FROM THE NJT LEVEL BELOW. |
| METROPOLITAN MUSEUM OF ART | TAKE THE ELEVATOR IN THE EUROPEAN SCULPTURE AND DECORATIVE ARTS GALLERY UP TO THE TOP AND GRAB A DRINK AT THE ROOF GARDEN CAFE AND MARTINI BAR (OPEN FRO MAY THROUGH THE FALL) |
| | EVERYONE KNOWS THE MET IS THE CITY'S MOST EPIC MUSEUM, WITH A VAST COLLECTION FROM ANCIENT TO MODERN. DONT' HAVE TO TELL YOU THAT IT IS A MUST SEE. I LOVE TO TWIRL AROUND THE PERIOD ROOMS ALONE. |
| | IT'S TRICKY TO NAVIGATE, AND OVERWHELMINGLY HUMONGOUS, BUT THAT'S ALL PART OF THE MET'S CHARM. WE LOVE LOSING OURSELVES IN THE MILES OF CORRIDORS AND OGLINE OVER THE MANY WORLD FAMOUS TREASURES. |

FIG. 20

GEOTAGGING UNSTRUCTURED TEXT

This invention was made with Government support under Contract No.: W911NF-09-2-0053 awarded by Army Research Office. The Government has certain rights in this invention.

BACKGROUND

The present disclosure relates generally to the field of geotagging unstructured text.

With the continued advances of social network services, such as TWITTER, FACEBOOK and FOURSQUARE, a tremendous amount of unstructured textual data has been generated. One of the most popular forms of such unstructured texts is a short text message, called a "tweet", from TWITTER. Each tweet has up to 140 characters. TWITTER users are posting tweets about almost everything from daily routine, breaking news, score updates of various sport events to political opinions and flashmobs (see A. Kavanaugh, S. Yang, S. D. Sheetz, and E. A. Fox. Microblogging in crisis situations: Mass protests in iran, tunisia, Egypt—in CHI 2011, and K. Starbird and L. Palen. (how) will the revolution be retweeted?: information diffusion and the 2011 Egyptian uprising—in CSCW 2012). Over hundreds of millions of such tweets are generated daily.

Furthermore, more and more business organizations recognize the importance of TWITTER and provide their customer services through TWITTER, such as receiving feedback about products and responding to customers' questions using tweets (see Twitter: A New Age for Customer Service—Forbes. http://onforb.es/VqqTxa).

Tweets can be much more valuable when tagged with their location information because such geo-tagged tweets can open new opportunities for many ubiquitous applications. For example, if a user posts a tweet tagged with her current location, nearby local stores can immediately send her customized coupons based on the context of the tweet or her profile (assuming that she is a subscriber of such location-based advertisement services). Similarly, local news and places of interest can be recommended based on the location, the context of the tweet and the past experiences of her friends on a social network. Geo-tagged tweets can also be used to report or detect unexpected events, such as earthquakes (see T. Sakaki, M. Okazaki, and Y. Matsuo. Earthquake shakes twitter users: real-time event detection by social sensors—in WWW 2010), robbery or gun shots, and notify the event to the right people instantly, including those who are close to the location of the event.

On one hand, like most social network services, TWITTER recognizes the value of tagging tweets with location information and provides the geo-tagging feature to all its users. On the other hand, such opt-in geo-tagging feature is confronted with several challenges. First, TWITTER users have been lukewarm in terms of adopting the geo-tagging feature. According to a recent statistical analysis over 1 billion tweets spanning three months (discussed in more detail below), only 0.58% tweets include their fine-grained location. With such a tiny amount of geo-tagged tweets, it would be very hard to realize the many social and business opportunities such as those mentioned above. Second, even for the limited tweets tagged with geometric coordinates, a fair amount of them cannot be used effectively because their geometric coordinates cannot be applied as quality indicators of useful semantic locations, such as points of interest and places where events of interest may happen or have happened. This location sparseness problem makes it very challenging for identifying the types of tweets in which their location information can be inferred, i.e., the location where a tweet was written. In order to derive new values and insights from the huge amount of tweets generated daily by TWITTER users and to better serve them with many location-based services, it is important to have more geo-tagged tweets with semantically meaningful locations.

For the purposes of this disclosure, various conventional techniques are categorized into four categories: 1) location prediction in TWITTER-like social networks, 2) topic and user group prediction in TWITTER-like social networks, 3) analysis of FOURSQUARE check-ins, and 4) location prediction using other online contents.

Referring first to conventional location prediction in social networks, these techniques can be divided into the problem of predicting the location of each TWITTER user (see Z. Cheng, J. Caverlee, and K. Lee. You are where you tweet: a content-based approach to geo-locating twitter users—in CIKM 2010; and B. Hecht, L. Hong, B. Suh, and E. H. Chi. Tweets from justin bieber's heart: the dynamics of the location field in user profiles—in CHI 2011; and J. Mahmud, J. Nichols, and C. Drews. Where is this tweet from? inferring home locations of twitter users—in ICWSM 2012) or predicting the location of each tweet (see Y. Ikawa, M. Enoki, and M. Tatsubori. Location inference using microblog messages—in WWW 2012 Companion; and W. Li, P. Serdyukov, A. P. de Vries, C. Eickhoff, and M. Larson. The where in the tweet—in CIKM 2011). Concretely, Z. Cheng, J. Caverlee, and K. Lee, You are where you tweet: a content-based approach to geo-locating twitter users proposes a technique to predict the city-level location of each TWITTER user. It builds a probability model for each city using tweets of those users located in the city. Then it estimates the probability of a new user being located in a city using the city's probability model and assigning the city with the highest probability as the city of this new user. To increase the accuracy of the location prediction, it utilizes local words and applies some smoothing techniques. B. Hecht, L. Hong, B. Suh, and E. H. Chi, Tweets from justin bieber's heart: the dynamics of the location field in user profiles uses a Multinomial Naive Bayes model to predict the country and state of each TWITTER user. It also utilizes selected region-specific terms to increase the prediction accuracy. J. Mahmud, J. Nichols, and C. Drews. Where is this tweet from? inferring home locations of twitter users presents an algorithm for predicting the home location of TWITTER users. It builds a set of different classifiers, such as statistical classifiers using words, hash-tags or place names of tweets and heuristics classifiers using the frequency of place names or FOURSQUARE check-ins, and then creates an ensemble of the classifiers to improve the prediction accuracy. These coarse-grained location prediction methods rely heavily on the availability of a large training set. For example, the number of tweets from the users in the same city can be quite large and comprehensive. In contrast, embodiments of the disclosure predict the location of tweets (the short unstructured text) at a fine granularity.

Y. Ikawa, M. Enoki, and M. Tatsubori. Location inference using microblog messages—in WWW 2012 Companion and W. Li, P. Serdyukov, A. P. de Vries, C. Eickhoff, and M. Larson, The where in the tweet—in CIKM 2011 centered on predicting the location of each tweet. W. Li, P. Serdyukov, A. P. de Vries, C. Eickhoff, and M. Larson, The where in the tweet builds a POI (Place of Interest) model, assuming that a set of POIs are given, using a set of tweets and web pages returned by a search engine. For a query tweet, it generates a language model of the tweet and then compares it with the model of each POI using the KL divergence to rank POIs.

Since it uses only 10 POIs and a small test set for its evaluation, it is unclear how effective the approach is in a real-world environment in which there are many POIs and a huge number of tweets and furthermore many tweets contain noisy text, irrelevant to any POI. Y. Ikawa, M. Enoki, and M. Tatsubori, Location inference using microblog messages extracts a set of keywords for each location using tweets from location-sharing services, such as FOURSQUARE check-in tweets, and other general expression tweets posted during a similar time frame. To predict the location of a new tweet, it generates a keyword list of the tweet and compares it with the extracted keywords of locations using cosine similarity. A clear problem with this work is that it treats all tweets equally in the context of location prediction. Thus, it suffers from high error rate in the prediction results, especially for those location-neutral tweets.

Reference will now be made to conventional topic and user group prediction in social networks. In addition to location prediction of TWITTER data, research efforts have been engaged in inferring other types of information from TWITTER data. J. Lin, R. Snow, and W. Morgan, Smoothing techniques for adaptive online language models: topic tracking in tweet streams—in KDD'11 proposes a framework to predict topics of each tweet. It builds a language model for each topic using hashtags of tweets and evaluates various smoothing techniques. M. Pennacchiotti and A.-M. Popescu. Democrats, republicans and starbucks afficionados: user classification in twitter—in KDD'11 proposes a social network user classification approach, which consists of a machine learning algorithm and a graph-based label updating function. L. Barbosa and J. Feng. Robust sentiment detection on twitter from biased and noisy data—in COLING 2010 proposes an approach to predict sentiments of tweets and F. Benevenuto, G. Magno, T. Rodrigues, and V. Almeida, Detecting spammers on twitter—in CEAS 2010 presents a technique to classify TWITTER users as either spammers or nonspammers. Most of the techniques in this category build their language-based classification model using supervised learning and utilize some external knowledge to initialize the classification rules, such as spam or non-spam. In contrast to this line of work, various embodiments focus on location detection of tweets rather than TWITTER user classification.

Reference will now be made to conventional analysis of FOURSQUARE check-ins. Z. Cheng, J. Caverlee, K. Lee, and D. Sui, Exploring millions of footprints in location sharing services—in ICWSM 2011; and A. Noulas, S. Scellato, C. Mascolo, and M. Pontil, An empirical study of geographic user activity patterns in foursquare—in ICWSM 2011 analyze FOURSQUARE check-in history in various aspects. Z. Cheng, J. Caverlee, K. Lee, and D. Sui, Exploring millions of footprints in location sharing services shows spatial and temporal (daily and weekly) distribution of FOURSQUARE check-ins. It also analyzes the spatial coverage of each user and its relationship with city population, average household income, etc. A. Noulas, S. Scellato, C. Mascolo, and M. Pontil, An empirical study of geographic user activity patterns in foursquare also shows spatiotemporal patterns of FOURSQUARE check-ins and calculates the transition probabilities among location categories.

Reference will now be made to conventional location prediction using other online contents. Many studies have been conducted to infer the geographical origin of online contents such as photos (see P. Serdyukov, V. Murdock, and R. van Zwol. Placing flickr photos on a Map—in SIGIR 2009), webpages (see E. Amitay, N. Har'El, R. Sivan, and A. S offer. Web-a-where: geotagging web content—in SIGIR 2004) and web search query logs (see R. Jones, R. Kumar, B. Pang, and A. Tomkins. "i know what you did last summer": query logs and user privacy—in CIKM 2007). P. Serdyukov, V. Murdock, and R. van Zwol, Placing flickr photos on a map builds a language model for each location (a grid cell) using the terms people use to describe images. E. Amitay, N. Har'El, R. Sivan, and A. S offer. Web-a-where: geotagging web content identifies geographical terms in web-pages using a gazetteer to infer a geographical focus for the entire page. R. Jones, R. Kumar, B. Pang, and A. Tomkins. "i know what you did last summer": query logs and user privacy utilizes a geo-parsing software which returns a list of locations for web search query logs to infer the location of users (at zip code level).

SUMMARY

In one example, the present disclosure relates to the field of geotagging unstructured text (in one specific example, a TWITTER tweet location is predicted using FOURSQUARE data).

In one embodiment, a method implemented in a computer system for extracting location information from unstructured text by utilizing a language model and a classifier is provided, the method comprising: obtaining, by a computer, the unstructured text; identifying by the computer, via use of the language model and based upon the received unstructured text, a location referred to by the received unstructured text; and determining by the computer, via use of the classifier, whether the location referred to by the received unstructured text is also a physical location from where the received unstructured text was sent.

In another embodiment, a computer readable storage medium, tangibly embodying a program of instructions executable by the computer for extracting location information from unstructured text by utilizing a language model and a classifier is provided, the program of instructions, when executing, performing the following steps: obtaining the unstructured text; identifying, via use of the language model and based upon the received unstructured text, a location referred to by the received unstructured text; and determining, via use of the classifier, whether the location referred to by the received unstructured text is also a physical location from where the received unstructured text was sent.

In another embodiment, a computer-implemented system for extracting location information from unstructured text by utilizing a language model and a classifier is provided, the system comprising: an input element configured to receive the unstructured text; an identifying element configured to identify, via use of the language model and based upon the received unstructured text, a location referred to by the received unstructured text; a determining element configured to determine, via use of the classifier, whether the location referred to by the received unstructured text is also a physical location from where the received unstructured text was sent; and an output element configured to output the determination of whether the location referred to by the received unstructured text is also the physical location from where the received unstructured text was sent.

In another embodiment, a method implemented in a computer system for extracting location information from unstructured text by utilizing a language model and a classifier is provided, the method comprising: building, by a computer, the language model; building, by the computer, the classifier; obtaining, by the computer, the unstructured text; identifying by the computer, via use of the language model and based upon the received unstructured text, a location referred to by the received unstructured text; determining by the computer, via use of the classifier, whether the location referred to by the received unstructured text is also a physical location from where the received unstructured text was sent; and outputting, by the computer, at least one of: (a) the location referred to by the received unstructured text; (b) the physical location from where the received unstructured text was sent; and (c) any combination thereof.

BRIEF DESCRIPTION OF THE DRAWINGS

Various objects, features and advantages of the present invention will become apparent to one skilled in the art, in view of the following detailed description taken in combination with the attached drawings, in which:

FIG. 8 depicts a Table related to example local keywords according to an embodiment.

FIG. 9 depicts a Table related to example geo-tagged tweets without a validation step according to an embodiment.

FIG. 12 depicts a Table related to example training sets according to an embodiment.

FIG. 15 depicts a Table related to example effects of different δ values according to an embodiment.

FIG. 17 relates to effects of different t f idf values threshold; and FIG. 18 relates to effects of different bigram language models).

FIG. 19 depicts a Table related to example percentage of geo-tagged tweets according to an embodiment.

FIG. 20 depicts a Table related to example text associated with inference of spatio-temporal tags from unstructured text according to an embodiment.

DETAILED DESCRIPTION

Figure 1:
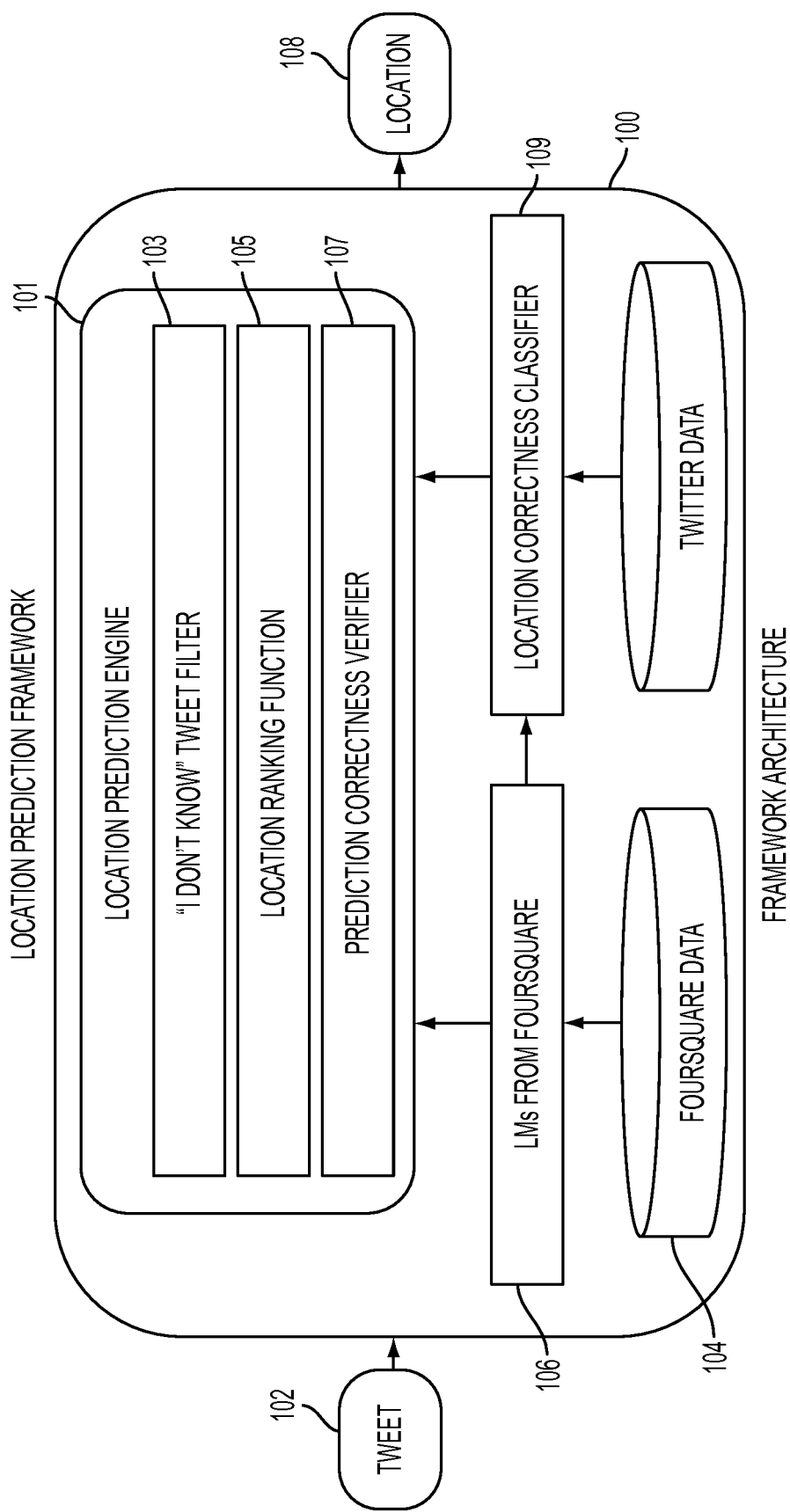
FIG. 1 depicts a block diagram of a framework architecture according to an embodiment.

In one example, one or more systems may provide for automatically geotagging unstructured text. In another example, one or more methods may provide for automatically geotagging unstructured text. In another example, one or more algorithms may provide for automatically geotagging unstructured text.

A more detailed discussion will now be made in connection with one embodiment. In this regard, described first are example reference data models for TWITTER and FOURSQUARE data. Next, described is utilization of example language models of short text messages to build example probabilistic models for locations of tweets. Finally, described are the design principles and the system architecture of an example location prediction framework.

Referring now to the TWITTER Reference Model, it is noted that TWITTER is a representative microblogging service that is used widely, from breaking news, live sports score updates, chats with friends (called followers) to advertising and customer service by many companies. TWITTER data consists of tweets. Formally, a tweet is defined by a user ID, a timestamp when the tweet was posted, and a short text message up to 140 characters. To enrich its data with location information, TWITTER provides not only a location field for each user but also a feature for geo-tagging each tweet (see Geo Developer Guidelines. https://dev.twitter.com/terms/geo-developer-guidelines). Therefore each tweet can be tagged with a fine-grained location, such as a geometric coordinate defined by a latitude and longitude, though the number of tweets with the geo-tag is very small. As described herein, an example prediction framework performs the location prediction based solely on the short unstructured text messages without requiring user ID and timestamp of tweets. In order to perform text analysis over all tweets, each tweet is formally modeled as a vector of words in a word vocabulary of n words, denoted by $<w_1, w_2, \ldots, w_n>$. For each tweet tx, if w1 appears 2 times in tx, we have a value 2 in the position of $w_1$. Thus, a tweet vector is a vector of n elements of integer type with each element $tx_i$ ($1 \le i \le n$) denoting the number of occurrences of the word $w_i$ in tx. To get a list of words from tweets, each tweet is processed by breaking the tweet into tokens, stemming the tokens, and removing stop words from them.

Referring now to the FOURSQUARE Reference Model, it is noted that FOURSQUARE is a social network service, which specializes in location-sharing through check-ins. As of September 2012 (see About foursquare. https://foursquare.com/about/), there are over 25 million users and over 2.5 billion check-ins, with millions more every day. Users can check into a place by selecting one of the nearby places from their current location (usually using their smartphones with GPS), and leave tips for a specific place. Each tip has up to 200 characters and is explicitly associated with one place. FOURSQUARE provides the basic information of places, such as name, address, website URL, latitude and longitude, and category. A fair number of FOURSQUARE users are linking their FOURSQUARE account with their TWITTER account such that their check-ins are automatically posted to their TWITTER accounts. It is believed that building probabilistic language models for locations using FOURSQUARE tips will be the first step towards developing a methodical approach to high quality location prediction for each tweet. Concretely, in order to integrate FOURSQUARE as an external location-specific data source for predicting the location of each tweet, each tip in FOURSQUARE is formally modeled based on the TWITTER vocabulary of n words. Thus, a tip tip is also represented as a vector of n elements of integer type, with each element $tip_i$ denoting the number of occurrences of the word $w_i$ in tip. Each tip is also associated with a location l. Similar to tweet tokenization process, a list of words from tips is obtained by breaking each FOURSQUARE tip into tokens, stemming the tokens, and removing stop words from them.

Referring now to the example Location Modeling, it is noted that in contrast to many conventional approaches (see Z. Cheng, J. Caverlee, and K. Lee. You are where you tweet: a content-based approach to geo-locating twitter users—in CIKM 2010; and J. Mahmud, J. Nichols, and C. Drews. Where is this tweet from? inferring home locations of twitter users—in ICWSM 2012; and W. Li, P. Serdyukov, A. P. de Vries, C. Eickhoff, and M. Larson. The where in the tweet—in CIKM 2011; and Y. Ikawa, M. Enoki, and M. Tatsubori. Location inference using microblog messages—in WWW 2012 Companion), which mainly use geo-tagged tweets to build a probabilistic model for each location, a high quality location model for tweets should identify those geometric coordinates that are actually associated with some semantically meaningful place(s) of interest (PoI) and build the location models only for those semantic locations (instead of building a location model for every geometric coordinate captured by some tweets). For example, there are many tweets which are not related to any location at all since people can tweet anything regardless of their location. For the purposes of this disclosure, those tweets that do not relate to any semantic location at all are referred to as "location-neutral tweets". Clearly, if too many such location-neutral tweets are involved in location modeling, the language models that are built for locations can be both noisy and misleading. Alternatively, if the sparseness problem of geo-tagged tweets is countered by dividing the geographical region of interest into multiple partitions (such as grids) and then building a language model using tweets generated in each partition, it will also be misleading since each partition may include tweets from multiple locations and it is hard to differentiate tweets written in one location from those written in another location (because each geo-tagged tweet has only latitude and longitude). This problem can be aggravated by the sampling errors existing in most of the conventional localization techniques.

FOURSQUARE, as a location-sharing social network service, has a collection of PoIs (places of interest), and each tip is associated with a short text message and a PoI. This makes FOURSQUARE a valuable resource for building good probabilistic language models for locations, because FOURSQUARE data includes one of the best human-encoded mappings of geometric locations to semantic locations (PoIs) as well as a set of short messages (tips) for them. This motivates the use of FOURSQUARE tips instead of noisy tweets to build more accurate and dependable probabilistic models for locations. In the situation where multiple locations have the same latitude and longitude (such as multistory buildings), a separate language model can be built for each location based on the corresponding PoIs and the set of tips associated with the PoIs.

Let the set of locations (PoIs) in FOURSQUARE be $l_1, l_2, \ldots, l_m$. To predict the location of tweets using the probabilistic models of locations, first build a language model (LM) for each FOURSQUARE location using a set of tips associated to that location. The language model has a probability for each word (unigram model) or each sequence of n words (n-gram model). Let tf(w, t) denote the number of occurrences of word w in the tip t, c(w, l) denote the number of occurrences of word w in all tips associated to location l and n be the number of all words in the word vocabulary. Calculate the probability of a word w in a location l using the frequency-based maximum likelihood estimation as follows:

$$p(w, l) = \frac{c(w, l)}{\sum_{i=1}^{n} c(w_i, l)}, \quad c(w, l) = \sum_{tip \in tips(l)} tf(w, tip)$$

where tips(l) is the set of tips associated to location l and "i" is an index for word tracking. Given that there are some FOURSQUARE locations with a very small number of associated tips, in order to generate dependable LMs using a sufficient number of tips, build LMs only for locations with more than a minimum number of tips (with the minimum defined by a system-supplied parameter θip which, in one example, is empirically identified based on experiments on the dataset) and also consider only commonly used words in modeling each location (identify commonly used words by removing those words that are NOT commonly used, which (in one example) are identified in the system as those words that are less than 5% occurring in tips; for example, in the case of a place such as Freedom Tower in NYC, the commonly occurring words would be "sacrificed", "remember", "World Trade Center"—these commonly used words will be dependent on the location and there are no set of common "commonly" used words).

Reference will now be made to another specific example, in particular a Bigram Language Model. Instead of the unigram models, where the language model has a probability for each word, a probability can be defined for each sequence of n words (n-gram model). For brevity, presented below is an example bigram model, which can be easily extended to n-gram models.

Let $p(w_{i-1}w_i|l)$ be the probability of a bigram $w_{i-1}w_i$ in the tips of location l. The probability of a tweet T for a location l using the bigram LMs is computed as follows:

$$p(l|T) = \prod_{w_{i-1}w_i \in T} p(w_{i-1}w_i, l)$$

To estimate the probability of bigrams by handling unobserved bigrams in the tips, three different smoothing techniques are discussed below: Laplace smoothing, Absolute discounting and Jelinek-Mercer smoothing (see S. F. Chen and J. Goodman. An empirical study of smoothing techniques for language modeling—in ACL 1996). The three smoothing techniques are defined as follows:

Laplace smoothing, which adds a value 1 to a frequency count of each bigram. This is defined as follows, where $c(w_{i-1}w_i, l)$ is the frequency count of a bigram $w_{i-1}w_1$ included in the tips of location l:

$$p(w_{i-1}w_i, l) = \frac{1 + c(w_{i-1}w_i, l)}{\sum_{w_i}(1 + c(w_{i-1}w_i, l))}$$

Absolute Discounting, which includes interpolation of bigram and unigram LMs by subtracting a fixed discount D from each observed bigram. This is defined as follows, where $N_{w_{i-1}}$ is the number of observed bigrams which starts with $w_{i-1}$ such that $|\{w_i:c(w_{i-1}w_i, 1\}|$:

$$p(w_{i-1}w_i, l) = \frac{\max\{c(w_{i-1}w_i, l) - D, 0\}}{\sum_{w_i} c(w_{i-1}w_i, l)} + \frac{D \cdot N_{w_{i-1}}}{\sum_{w_i} c(w_{i-1}w_i, l)} \cdot \frac{c(w, l)}{\sum_{w_i} c(w_i, l)}$$

Jelinek-Mercer smoothing, which linearly interpolates between bigram and unigram LMs using parameter λ:

$$p(w_{i-1}w_i, l) = \lambda \cdot \frac{c(w_{i-1}w_i, l)}{\sum_{w_i} c(w_{i-1}w_i, l)} + (1-\lambda) \frac{c(w_i, l)}{\sum_{w_i} c(w_i, l)}$$

Intuitively, the unigram LMs might be sufficient for short text messages like tweets. But experiments compare the unigram models with the bigram models in terms of the prediction precision and errors.

Reference will now be made an example system architecture (see FIG. 1). Even though dependable language models are built for locations using FOURSQUARE tips, there are still several unique challenges for prediction of the fine-grained location of each tweet. The first challenge is that there are lots of tweets that may not be related to any location at all. Thus, it is important to distinguish those location-neutral tweets, which are completely irrelevant to any location, from those tweets whose locations can be learned and predicted. For example, some daily mundane tweets, such as "Have a good day!", rarely have any hint that can be used to predict their location. To address this effective techniques are developed to filter out as many location-neutral tweets as possible to minimize the noise level and improve the accuracy of the location prediction model. The second challenge is that a tweet can refer to another location which is not related to the current location where the tweet was written. For example, it is not unusual that TWITTER users post tweets about sports games of their favorite teams even though their current location is not at all related to the locations where the games are being played. Therefore, an approach is developed to detect whether the referred location of a tweet, predicted by the location prediction model, is the same as its current location. The referred location of a tweet means the location which is explicitly mentioned or implicitly hinted in the tweet. Finally, to respect the privacy of users, the location prediction model should not depend on user ID and timestamp of the tweets. To address these challenges, a multi-phase location prediction framework is developed that utilizes the probabilistic models of locations built using FOURSQUARE tips.

Referring now again to FIG. 1, a block diagram of a system architecture for predicting the fine-grained location of a tweet is shown. This framework 100 consists of three tasks: (i) Identification of "I don't know" tweets, which are also referred to as location-neutral tweets, (ii) Ranking and predicting the referred location of a tweet, which is implied explicitly or implicitly by the text message of the tweet, and (iii) Using the classification model to determine whether there is a match between the referred location and the actual physical location of that tweet. The first step is to identify if the tweet has any location-specific information. The approach uses simple and yet effective pruning techniques to differentiate tweets with location-specific information from tweets having no location-specific hint at all, by utilizing the probabilistic language models for locations built using FOURSQUARE tips (as discussed above). This allows filtering out noisy tweets at early phase of the location prediction process. For those tweets that have passed the "I don't know" filter, the next step is to select the best matched location among the set of possible locations for each tweet using ranking techniques. Finally, the third step is to validate whether the predicted location of a tweet is indeed the correct location with respect to the actual location where the tweet was written. Details of each step follow.

Referring now to location prediction (see location prediction engine 101 of FIG. 1), a discussion is provided regarding a set of example steps taken to predict the fine-grained location of each tweet (as well as how to utilize the probabilistic language models for locations built based on FOURSQUARE tips and the geo-tagged tweets from TWITTER in the location prediction and validation framework). First discussed is how to identify and prune the "I don't know" tweets (see the "I don't know" tweet filter 103 of FIG. 1). Next a description is made of how to design the ranking algorithms to select the best location candidate among a set of possibilities for a tweet (see the location ranking function 105 of FIG. 1). Finally, a description is made of how to utilize SVM classifier and the geo-tagged tweets as the training data to develop classification models that validate the correctness of the predicted location of a tweet with respect to the actual physical location from where the tweet was generated (see the prediction correctness verifier 107 and the location correctness classifier 109 of FIG. 1). Still referring to FIG. 1, it is additionally seen that a tweet 102 is used as an input, FOURSQUARE data 104 is applied to produce language models 106 and location 108 is provide as an output.

Reference will now be made more particularly to "I don't know" Tweets (that is, tweets which have little or no information about their location or are talking about a past or a future event). Given a tweet, if there is not any hint about its location, we filter the tweet out (before predicting the location of tweets) since there is no chance of predicting its location using only textual information of the tweet. Also, if a tweet is talking about past or future activities or events, we exclude the tweet because we cannot predict its current actual location even though we may infer the past or future location referred in the tweet. In this disclosure, the current location of a tweet refers to a location where the tweet was written. To find such "I don't know" tweets, local keywords and PoS (Part of Speech) tags are utilized.

With reference to utilizing local keywords, even though each FOURSQUARE tip is explicitly coupled with a location, it also includes some words which are too general to represent the location (e.g. "awesome", "menu", "special"). If a tweet consists of only such general words, it would be impossible to predict the tweet's location because many locations have such words and it is hard to differentiate (rank) among the locations. For example, a tweet "This sun is BLAZING and there's no shade" has no hint about its fine-grained location because all words in the tweet are too general to represent any location. To extract any hint about fine-grained locations from tweets, we define local keywords as a set of words which are representative of a location. To find the local keywords, we calculate the t f idf (Term Frequency, Inverse Document Frequency) (see C. D. Manning, P. Raghavan, and H. Schtze. Introduction to Information Retrieval. Cambridge University Press, 2008) score for each word and each location. Let L be the total number of locations and $df_w$ be the number of locations having w in their tips. Our t f idf calculation for a word w and a location l is formally defined as follows:

$$tfidf_{w,l} = p(w, l) \times \log_{10} \frac{L}{df_w}$$

For a word w, if there is any location l in which its score t f idf$_{w,l}$ is larger than a threshold, denoted by $\theta_{tfidf}$, we treat the word w as a local keyword with respect to the location l. If a tweet has no local keyword at all, then we classify the tweet as a "I don't know" tweet. The threshold $\theta_{tfidf}$ for choosing local keywords is a tuning parameter in the framework. If we increase the threshold value, a smaller number of local keywords will be selected, and then more tweets could be filtered out as "I don't know" tweets.

With reference to utilizing PoS tags, even though a tweet has a sufficient number of local keywords, we may not guarantee that the predicted location based on the language models will match the current location, where the tweet was written, with a high confidence when the tweet is talking about the future or past event. For example, a tweet "I'm going to MoMA" has a local keyword "MoMA" (abbreviation for the Museum of Modern Art in New York City), but is talking about the future location. Therefore, even though we can predict the referred location in the tweet based on the local keywords such as "MoMA" in this example, the predicted location is related to the location where the author of the tweet will be, rather than the current location where this tweet is written. To detect those tweets talking about the past or future location, PoS (Part-of-Speech) tags generated by a PoS tagger are utilized. Given a tweet, if the generated PoS tags of the tweet include any tag about the past tense form, we treat the tweet as a "I don't know" tweet. Since there is no tag about the future tense in existing PoS taggers, we utilize some words related to future or with future sense, such as "will", "going to" and "tomorrow", and remove those tweets that contain such words.

Reference will now be made to ranking techniques that are applied after filtering out the location-neutral tweets. A discussion follows regarding three different techniques to rank locations for each of the tweets survived from the "I don't know" filter. Given a query tweet, there is a set of candidate locations that are associated to the tweet based on the language models for locations. To predict the location of the tweet, we need to rank all locations and select the location having the highest rank (or top k locations) as the predicted location of the tweet.

In one example, standard machine learning approaches are used. One intuitive baseline approach is to build classification models using standard machine learning techniques such as SVM and decision tree. To choose a training set for learning the models, we sample some tips for each location. In our training set, each instance and each feature represent a FOURSQUARE tip and a word respectively. The number of classes in the training set is equal to the number of all locations. Thus, given a tweet, we use the predicted class by the classification models as the predicted location of the tweet.

In another example, a Naive Bayes model is used. Given a set of candidate locations for a tweet, we use the simple naive Bayes probabilistic model to rank locations based on the conditional independence assumption among words. Concretely, given a tweet T and the set of possible locations, we calculate the naive Bayes probability for each location l as follows:

$$p(l|T) = \frac{p(l) \prod_{w \in t} p(w, l)}{\Sigma_i p(l_i) \prod_{w \in t} p(w, l_i)}$$

where p(l) is 1/L for all locations since in this embodiment we assume the uniform distribution for locations. We predict the location having the highest probability as the tweet's location. To remove any zero probability, we apply Laplace smoothing.

Another example relates to t f idf value. The Naive Bayes model uses the probability of a word in each location when calculating the ranking probability of locations. If we want to reflect how important a word is in all locations, we can incorporate such global word weights by using the t f idf values to rank the locations for a given tweet. Concretely, for a given tweet T, let $L_T$ denote the set of candidate locations of T. We calculate the t f idf value for each location l in $L_T$ as follows:

$$tfidf_{T,l} = \frac{\sum_{w \in T} tfidf_{w,l}}{\sum_{l \in L_T} \sum_{w \in T} tfidf_{w,l}}$$

We use the location having the largest normalized t f idf ranking score as the predicted location of tweet T.

Reference will now be made to Classification-based Prediction Validation. Even though we can filter out some "I don't know" tweets using the local keyword filter and the PoS tag filter, sometimes the top-ranked candidate location for a tweet will fail to predict the actual location where the tweet was written. This is especially true for those tweets whose actual locations where the tweets were written are quite different from the referred location produced by the ranking algorithms. For example, we may think that the referred location in a real tweet "Let's Go Yankees!!!" is "Yankees Stadium" and some of the ranking techniques also find "Yankees Stadium" as the predicted location of the tweet. However, it is not unusual that many New York Yankees fans in the world post such tweets anywhere during the game or before the game. Another interesting real tweet is "I hope you all have a GREAT weekend but also take time to remember those we've lost; those who are still fighting for our freedom! !". Under an assumption that we know this tweet is from New York City, some of the ranking techniques find "World Trade Center" as the predicted location of the tweet. We can easily see that the tweet is closely related to "World Trade Center" semantically, however such tweets can be posted from anywhere. The main challenge for predicting the location for this type of tweets is to provide the prediction validation capability for the system to determine if the referred location $l_{ref}$ (T) for a tweet T, obtained using the probabilistic language models and one of the three ranking algorithms, will match the actual location $l_{cur}$(T) where the tweet I was written. If we detect that $l_{ref}$(T) does not match $l_{cur}$(T), then we classify the tweet as an "unpredictable" tweet and exclude the tweet from location prediction. One approach to finding such "unpredictable" tweets is to build a classification model using standard machine learning techniques. To learn the classification model, we need to prepare a training set carefully. One approach to preparing the training set is to use those tweets having a geo-tag (i.e., latitude and longitude), because such tweets already have their explicit current location, thus we can use the language models and one of the ranking algorithms to extract their referred location to build the training set. Given a tweet T having its geo-tag, after choosing the location (denoted as $l_{top}$(T)) having the highest probability based on the naive Bayes probability, we additionally compare the probability of $l_{top}$ (T) with that of the other locations using a probability ratio test. We use the probability ratio test to build a good training set consisting of only tweets in which there is high confidence in their referred location. We choose only those tweets that pass the probability ratio test, formally defined as follows:

$$\frac{p(l_{ref}(T)|T)}{1 - p(l_{ref}(T)|T)} > \delta$$

where δ is the criterion of the test. If we increase δ, a smaller number of tweets will be selected for the training set.

Based on the generated training set, we learn classification models by running the decision tree classifier and SVM (Support Vector Machine) with the polynomial kernel functions and Gaussian radial basis functions using 10-fold cross-validation. Then we choose a classification model having the highest cross-validation precision for the training set and use this classification model for detecting the "unpredictable" tweets. To find parameters having the highest cross-validation precision, we use the grid search. Discussed herein are some example results returned by the classification model. For a real tweet "The line at this Chipotle in Brooklyn Heights is really long", the model detects that its referred location, produced by the language models and the ranking algorithm, indeed matches the actual location where this tweet was written, as indicated by the geo-tag of the tweet. Therefore, the model correctly classifies this tweet and thus validates the correctness of the predicted location of the tweet. Note that the accuracy of the prediction depends on the language models, whereas the accuracy of the prediction validation depends on the training set.

As described herein, a framework is provided which can predict precise location of unstructured texts in social networks under a hypothesis that the unstructured textual data contains implicit location information at a fine granularity. In one example, the framework consists of three unique features: (i) we build a probabilistic model for each location using purely unstructured texts from a social network service specialized in location information. (ii) we develop a classification model for automatically identifying location-predictable textual data. (iii) we provide algorithms to predict the precise location of unstructured texts in social networks using the generated models.

Figure 2:
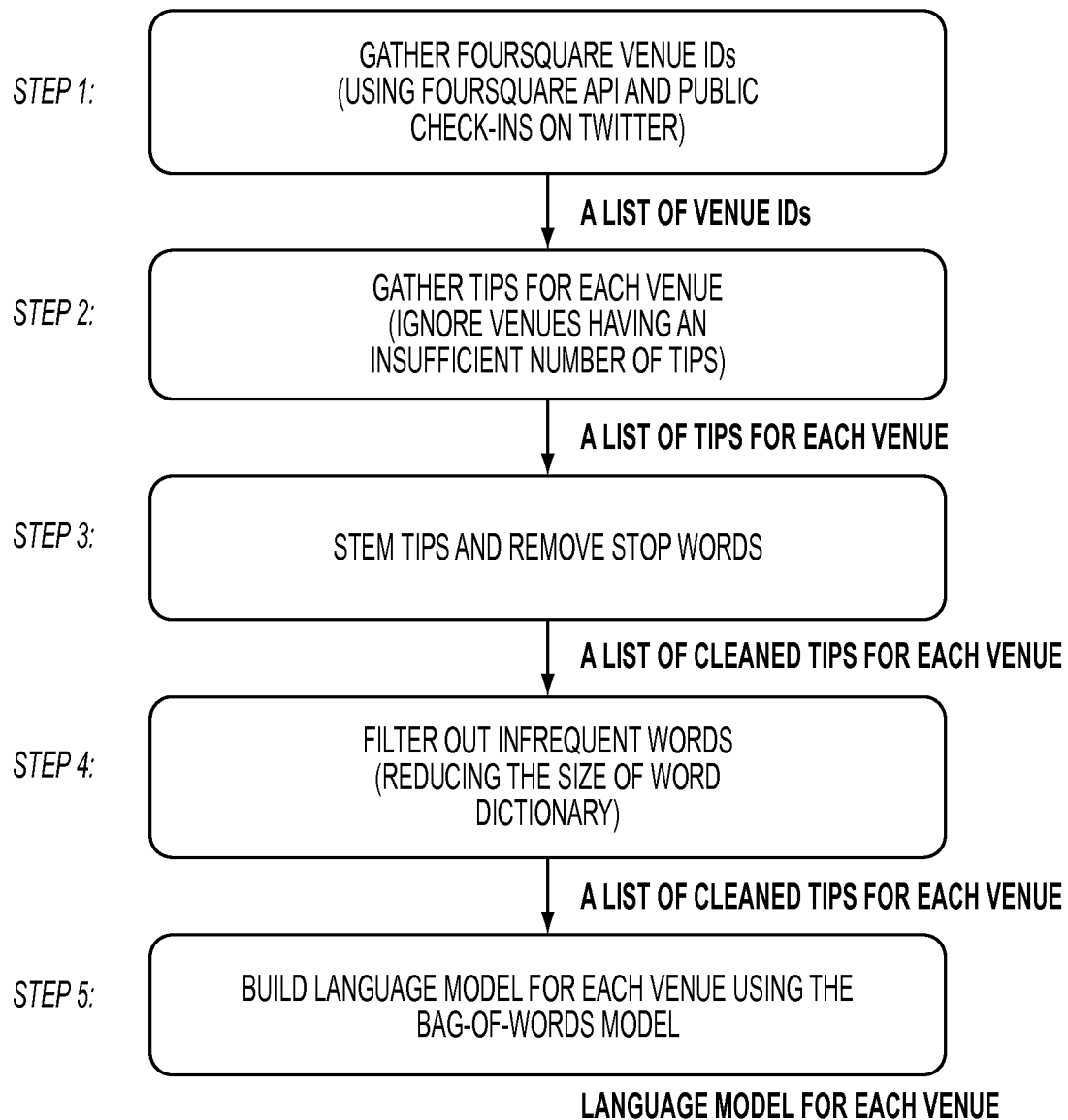
FIG. 2 depicts a flowchart of a method according to an embodiment.

Referring now to FIG. 2, a flowchart of a sequence of steps according to another embodiment is depicted. As seen, a model may be built by following the enumerated steps. More particularly, these steps comprise: Step 1: gather FOURSQUARE venue IDs; Step 2: gather tips for each venue; Step 3: stem tips and remove stop words; Step 4: filter out infrequent words; Step 5: build language model for each venue. Once the model is built, it is used by a classifier (discussed in more detail herein) for predicting accurate location information.

Figure 3:
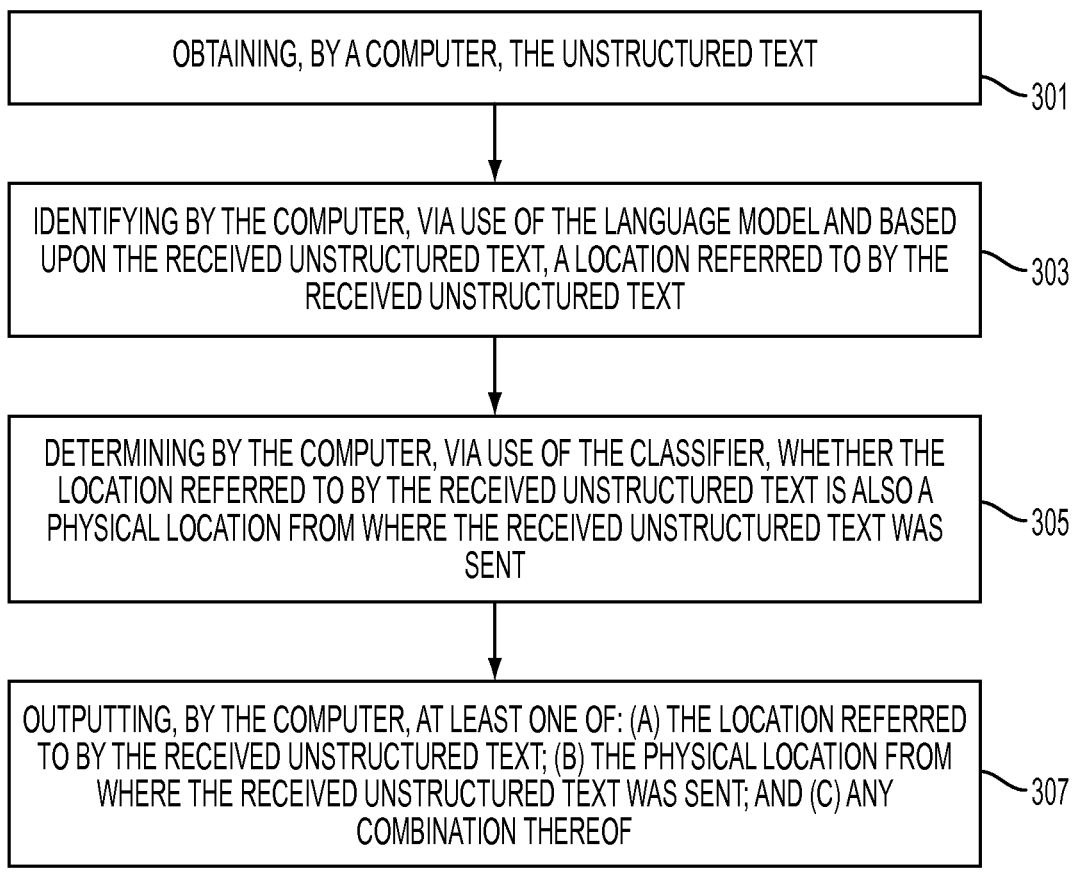
FIG. 3 depicts a flowchart of a method according to an embodiment.

Referring now to FIG. 3, a method implemented in a computer system for extracting location information from unstructured text by utilizing a language model and a classifier is shown. As seen in this FIG. 3, the method of this embodiment comprises: at 301—obtaining, by a computer, the unstructured text; at 303—identifying by the computer, via use of the language model and based upon the received unstructured text, a location referred to by the received unstructured text; and at 305—determining by the computer, via use of the classifier, whether the location referred to by the received unstructured text is also a physical location from where the received unstructured text was sent.

In one example, the method further comprises outputting (at 307) at least one of: (a) the location referred to by the received unstructured text; (b) the physical location from where the received unstructured text was sent; and (c) any combination thereof.

In another example, the result of the determination may be output.

In another example, any steps described above may be carried out in any appropriate desired order.

Figure 4:
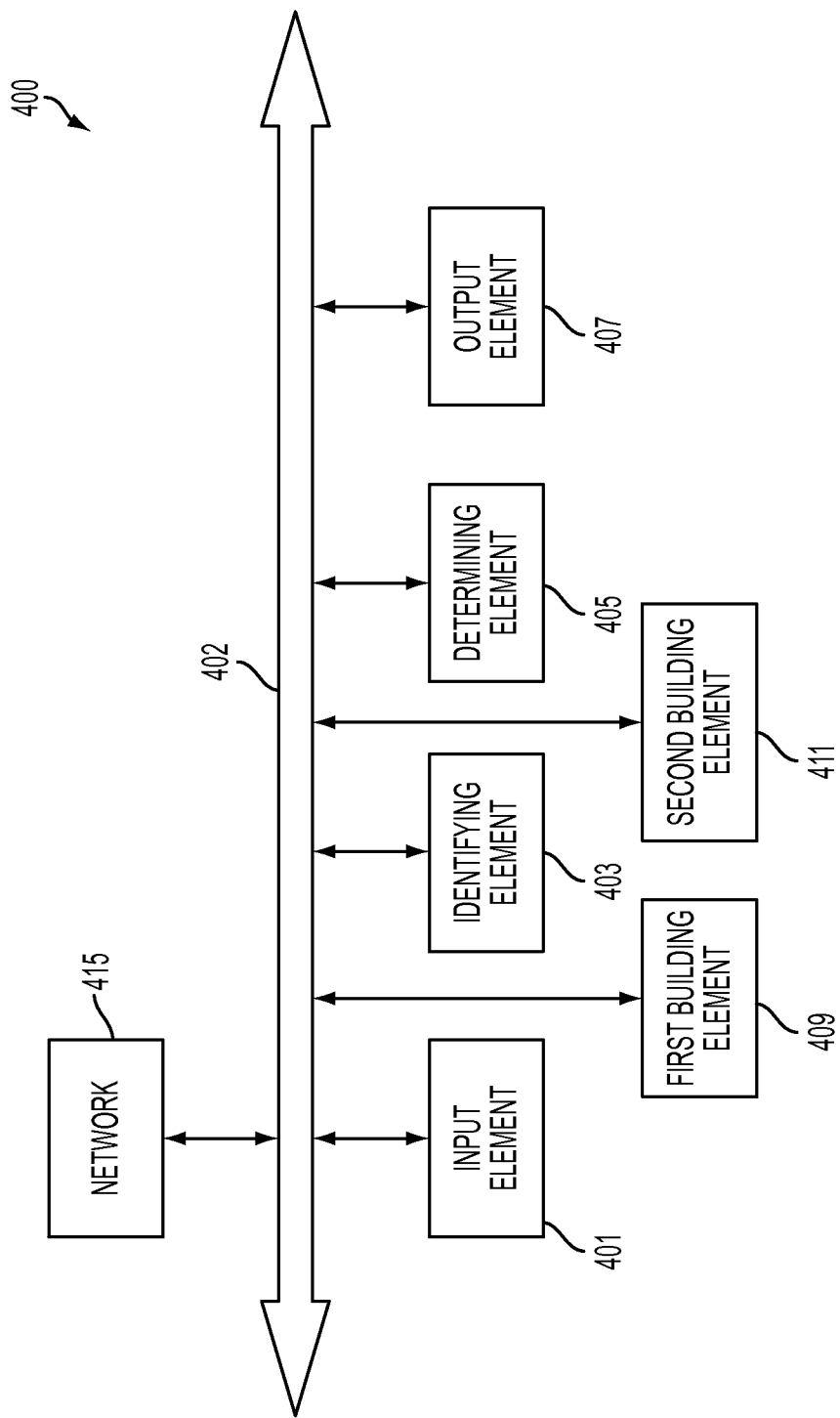
FIG. 4 depicts a block diagram of a system according to an embodiment.

Referring now to FIG. 4, in another embodiment, a computer-implemented system 400 for extracting location information from unstructured text by utilizing a language model and a classifier is provided. This system may include the following elements: an input element 401 configured to receive the unstructured text; an identifying element 403 configured to identify, via use of the language model and based upon the received unstructured text, a location referred to by the received unstructured text; a determining element 405 configured to determine, via use of the classifier, whether the location referred to by the received unstructured text is also a physical location from where the received unstructured text was sent; and an output element 407 configured to output the determination of whether the location referred to by the received unstructured text is also the physical location from where the received unstructured text was sent.

In one example, the output element 407 may be configured to output at least one of: (a) the location referred to by the received unstructured text; (b) the physical location from where the received unstructured text was sent; and (c) any combination thereof.

In another example, the system 400 may include: a first building element 409 configured to build the language model and/or a second building element 411 configured to build the classifier.

Still referring to FIG. 4, each of the elements may be operatively connected together via system bus 402. In one example, communication between and among the various elements may be bi-directional. In another example, communication may be carried out via network 415 (e.g., the Internet, an intranet, a local area network, a wide area network and/or any other desired communication channel(s)). In another example, some or all of these elements may be implemented in a computer system of the type shown in FIG. 22.

Figure 5:
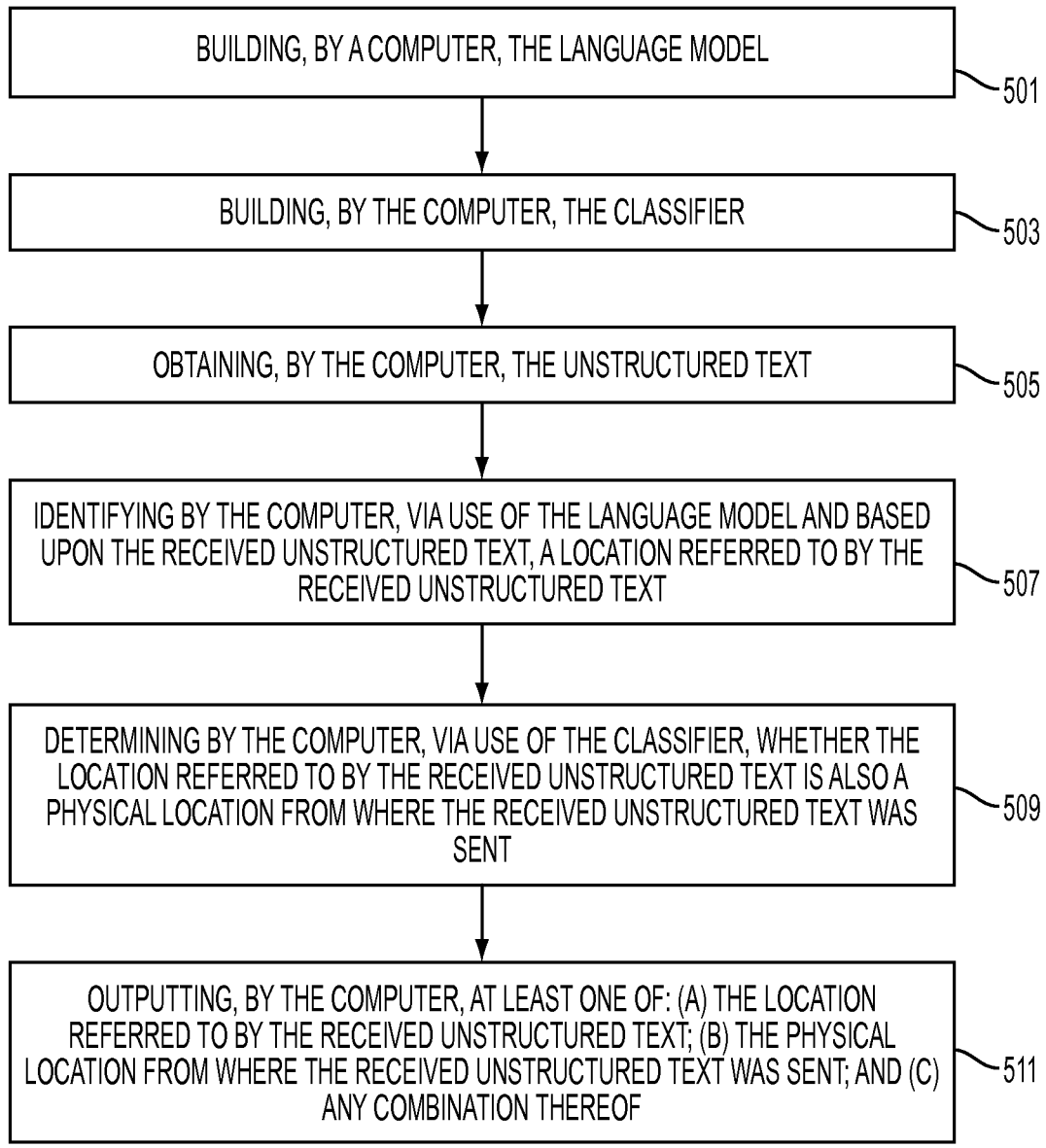
FIG. 5 depicts a flowchart of a method according to an embodiment.

Referring now to FIG. 5, a method implemented in a computer system for extracting location information from unstructured text by utilizing a language model and a classifier is shown. As seen in this FIG. 5, the method of this embodiment comprises: at 501—building, by a computer, the language model; at 503—building, by the computer, the classifier; at 505—obtaining, by the computer, the unstructured text; at 507—identifying by the computer, via use of the language model and based upon the received unstructured text, a location referred to by the received unstructured text; at 509—determining by the computer, via use of the classifier, whether the location referred to by the received unstructured text is also a physical location from where the received unstructured text was sent; and at 511—outputting at least one of: (a) the location referred to by the received unstructured text; (b) the physical location from where the received unstructured text was sent; and (c) any combination thereof.

In another example, any steps described above may be carried out in any appropriate desired order.

Reference will now be made to experiments which evaluated an example location prediction framework conducted across a large number of tweets collected over a three-month period. The experimental results relate to building the language models using the datasets, implementing the prediction validation classifier to distinguish the predictable tweets from those non-predictable ones, and the effectiveness of two filters to find "I don't know" tweets. In addition, evaluated is the effectiveness of the example location prediction approach by studying the effects of different parameters on the precision of location prediction, such as the effects of different ranking methods, the effects of unigram vs. bigram language models, the effects of different $\delta$ values for building prediction validation classifier, and the effects of different t f idf threshold values. The experimental results show that by coupling a multi-source based location prediction approach with a classification-based prediction validation method, the approach significantly increases the percentage of tweets that can be geo-tagged automatically at a fine granularity of locations with high accuracy.

Referring now to the datasets, the experiments gathered a set of tweets spanning from April 2012 to June 2012 using TWITTER Decahose (see Twitter Decahose http://gnip.com/twitter/decahose) which is a feed of 10% of all tweets. Each day (24 hours) has about 37 million tweets and only 0.58% tweets are geo-tagged (i.e. include fine-grained location information). To focus on predicting the fine-grained location, it is assumed that the city-level (or similar) location of tweets is known because previous work (see Z. Cheng, J. Caverlee, and K. Lee. You are where you tweet: a content-based approach to geo-locating twitter users—in CIKM 2010; and J. Mahmud, J. Nichols, and C. Drews. Where is this tweet from? inferring home locations of twitter users—in ICWSM 2012) has addressed this. Since some tweets explicitly include their city-level location even though they don't have their geo-tag, such information can also be utilized. Tweets were selected from Manhattan, N.Y., USA because Manhattan (officially a borough of New York City), which covers 59 square kilometers (23 square miles), is one of the biggest and most densely populated cities in the world. Based on their geo-tag (latitude and longitude), 127,057 tweets (spanning three months) from Manhattan were selected. Among them, excluded were 39,157 tweets from FOURSQUARE and 15,299 tweets from INSTAGRAM to remove any possible bias from them because they already include the location name in their textual data and so it would be straightforward to predict their location. Therefore, 72,601 tweets were used to evaluate the example prediction framework.

Figure 6:
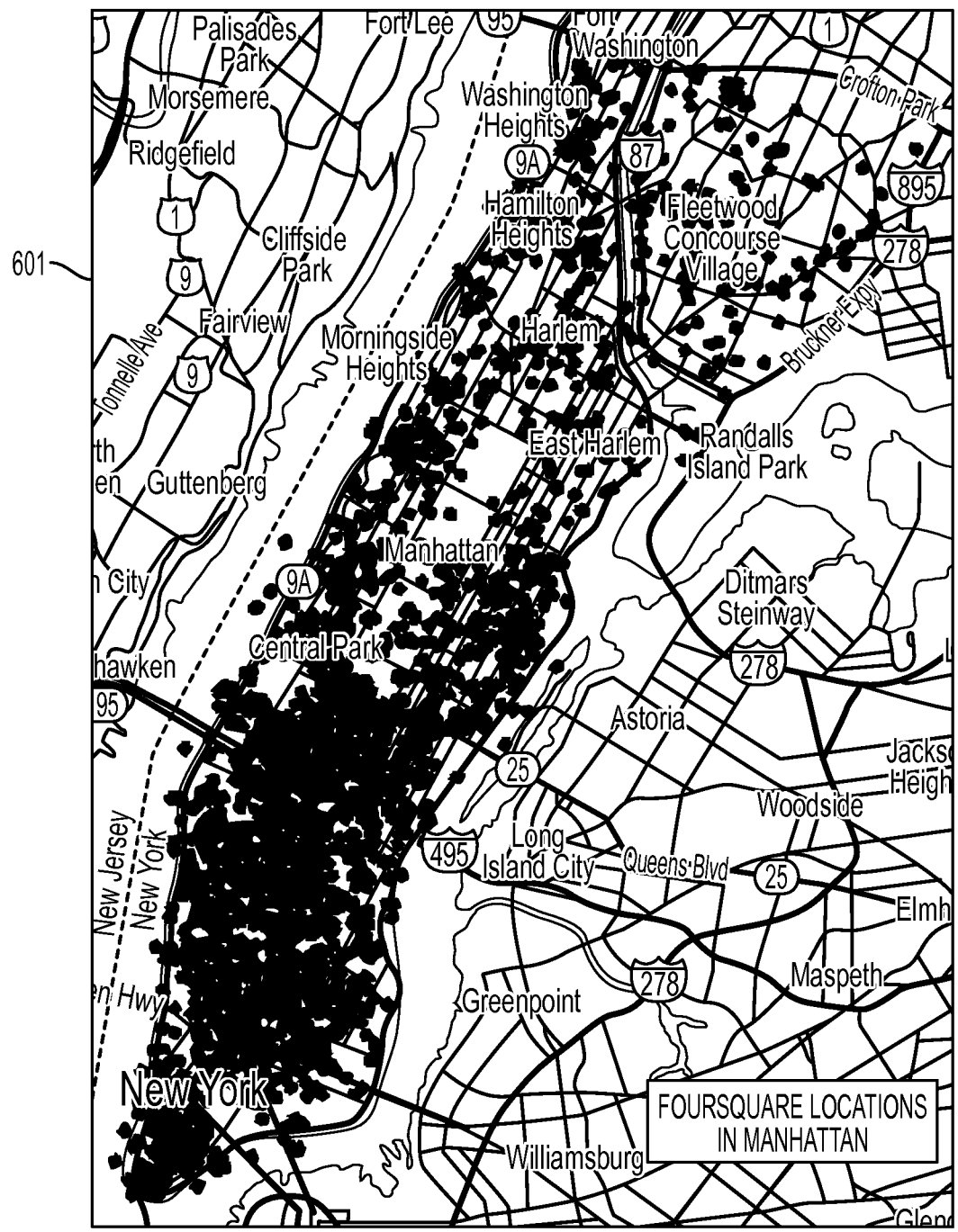
FIGS. 6 and 7 depict example FOURSQAURE locations and tips according to an embodiment.
Figure 7:
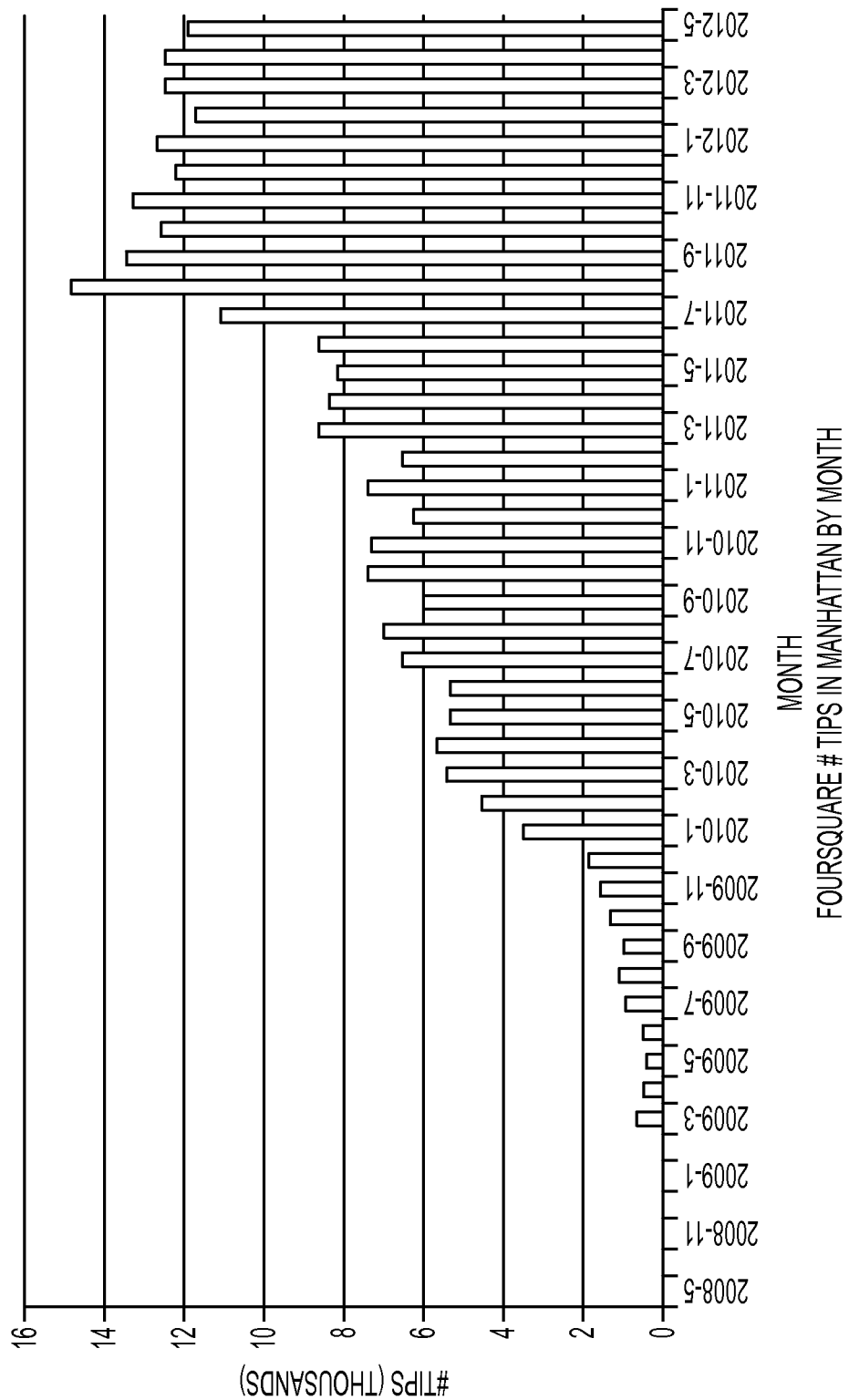

In these experiments, extracted were FOURSQUARE locations, called venues, and their tips using FOURSQUARE API. First, to gather a set of FOURSQUARE locations, called were the FOURSQUARE venues API for each cell after splitting the area of Manhattan into very small cells (each covers 50 m×50 m). Unfortunately, there were some missing locations using only this grid search. Therefore, to find additional locations, analyzed were the URLs included in check-in tweets from FOURSQUARE and then location IDs were extracted from them. Each FOURSQUARE location has basic information such as name, address, latitude, longitude, city, country and category. Finally, for each gathered location, extracted were all its tips using FOURSQUARE API. Using this approach, gathered were 25,171 venues in Manhattan and their 268,470 tips which spans from May 2008 to June 2012. Also, there are some locations in which their area is too wide to represent their location using only one point, such as Central Park, Times Square and Yankee Stadium. Since FOURSQUARE doesn't provide boundary information of its locations, extracted were boundary information of 22 wide locations in Manhattan using Google Maps. FIG. 6 shows the geographical distribution 601 of FOURSQUARE locations in Manhattan and FIG. 7 shows the distribution of total tips over the past 4 years, which shows a tremendous increase in the number of FOURSQUARE tips in the more recent years.

Reference will now be made to building language models in these experiments. To build the language models for the extracted locations, first chosen were locations which have more than 50 tips and so 1,066 locations were selected. Also, language models of locations having more than 30 tips and 100 tips were used. However, the location prediction accuracy using them was not better than using locations having more than 50 tips. It is believed that 30 or 40 tips are not enough to build a distinct language model for each location. On the other hand, for locations having more than 100 tips (e.g., 500 tips), it is believed that the prediction accuracies will improve with more tips. However, there were only about 300 FOURSQUARE locations in Manhattan having more than 100 tips and it is believed that this number is too small to cover the area of Manhattan. Therefore, the reported results are using language models of locations having more than 50 tips. For each location, to get a list of words from its tips, each tip was first broken into tokens. Then the tokens were stemmed using a stemmer (stemming is the process of reducing inflected words to their stem (see, e.g., http://en.wikipedia.org/wiki/Stemming) and it can be achieved using any software capable of this).

and any stop words in the tokens were removed using stop words of Rainbow (see A. K. McCallum. Bow: A toolkit for statistical language modeling, text retrieval, classification and clustering; 1996). In addition to removing stop words, to consider only commonly used words for the location, excluded were words which appear in less than 5% tips among all tips of the location. Through this filtering, those words can be removed that are less common or contain typos, thus reducing the size of the word vocabulary (i.e., a set of all words used in the language models). Finally, 3,073 words are included in the word vocabulary.

Reference will now be made to finding "I don't know" tweets in these experiments. To find local keywords, empirically chosen were three different tf idf threshold values: 0.1, 0.2 and 0.3. For example, assume that a word appears in 10% of all locations (i.e. inverse document frequency, idf=1). Intuitively it may be thought that the word is too general to be included in the local keywords. By using 0.1 as the threshold, there should be any location in which the term frequency (tf) of the word is larger than 0.1 to be selected as a local keyword. Since it is rare for a word to occupy 10% of all tips, the word will be filtered out by the threshold. The Table in FIG. 8 shows the number of example selected local keywords, among 3,073 words in the word vocabulary, for different t f idf threshold values. To find tweets which are talking about the future or past, utilized were PoS tags generated by GPoSTTL (see GPoSTTL. http://gposttl.sourceforge.net/).

Reference will now be made to a prediction without validation step. In this regard, in these experiments, the prediction accuracy of the example framework is first evaluated without applying the validation step for the predicted locations. To measure the prediction accuracy, given a tweet, compare the geo-tag, which was removed during the prediction steps, of the tweet with the latitude and longitude (or boundary) of the predicted location. If the predicted location has its boundary information and the geo-tag of the tweet is within the boundary, the prediction error is 0. Otherwise, calculate the Euclidean distance between the geo-tag of the tweet and the latitude and longitude of the location and then use the distance as the prediction error. Of note, the acceptable prediction errors depend on the application in question. For example, automated geospatial review applications may require the location of the individual to be identified accurately (within 100 m). On the other hand, applications such as event localization can tolerate a few hundreds of meters of error.

Figure 10:
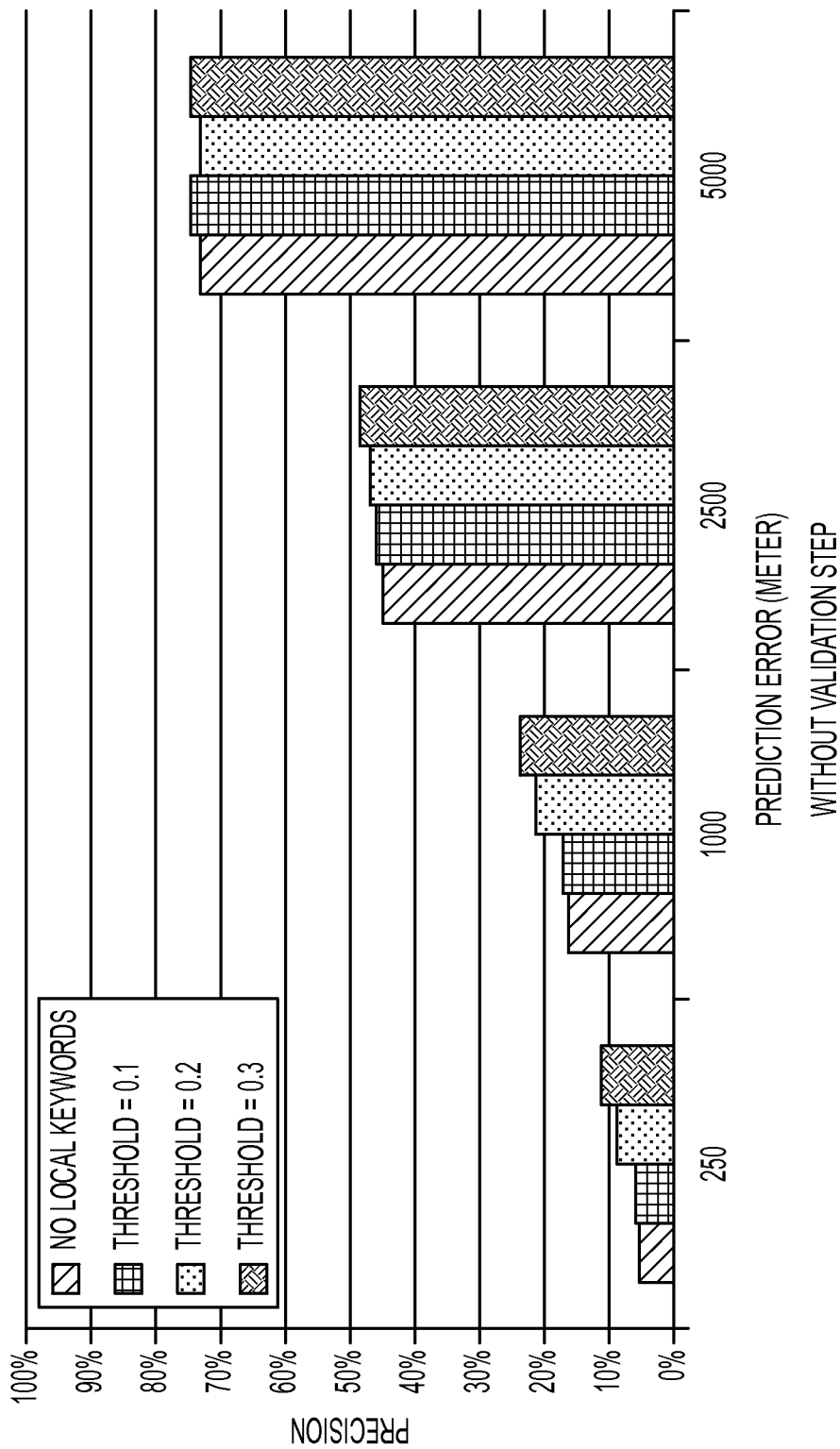
FIGS. 10 and 11 depict example graphs related to effects of validation according to an embodiment.

The Table depicted in FIG. 9 shows that the example framework without the validation step can geo-tag a huge number of tweets, compared to 0.58% in the original TWITTER data. However, as shown in FIG. 10 where the naive Bayes model is used as the ranking technique (different ranking techniques will be compared later), the prediction precision is not satisfactory because only 10% of predicted tweets are located within 250 m from their actual location—even though very selective local keywords (i.e., threshold=0.3) are applied. Here, the precision means the percentage of predicted tweets whose prediction error is less than a specified distance (250 m, 1,000 m, 2,500 m and 5,000 m in FIG. 10). Although this result is meaningful compared to conventional coarse-grained prediction frameworks, one of the goals is to ensure high accuracy of a fine-grained location prediction. The results discussed below show that the prediction accuracy can be considerably improved using the prediction validation step according to an embodiment.

Reference will now be made to building models for validation. In this regard, in these experiments, to validate the correctness of the predicted locations in terms of their likelihood to match the actual location where the tweets were written, it is needed to teach the classification models using the training datasets. In this set of experiments, three different δ values: 0.5, 1.0 and 2.0 were empirically used to generate three training sets. In other words, given a tweet, if there is a location whose naive Bayes probability is larger than 33%, 50% and 66%, the tweet will be included in the training set with the δ value of 0.5, 1.0 and 2.0 respectively. For each tweet, to label whether its referred location is equal to its current location, compare the latitude and longitude of the referred location, extracted from FOURSQUARE, with the geo-tag (i.e. current location) of the tweet. If the distance between the two locations is less than 100 meters or the geo-tag of the tweet is within the boundary of its referred location, then label that the tweet's two locations are same. The Table of FIG. 12 shows the number of selected tweets, the number of tweets whose two locations are different and the number of tweets whose two locations are same, for different δ values among 72,601 tweets.

Reference will now be made to location prediction with validation step. Below, the effectiveness of the classification-based prediction validation step for improving the prediction accuracy is shown. Then the location prediction accuracy is compared by different ranking techniques and different parameter values. In this example, used is the t f idf threshold of 0.2 and the δ value of 0.5, unless specifically noted, because it is believed that this setting strikes a balance between the number of geo-tagged tweets and the prediction accuracy. Also shown below are the effects of different parameter values.

Figure 11:
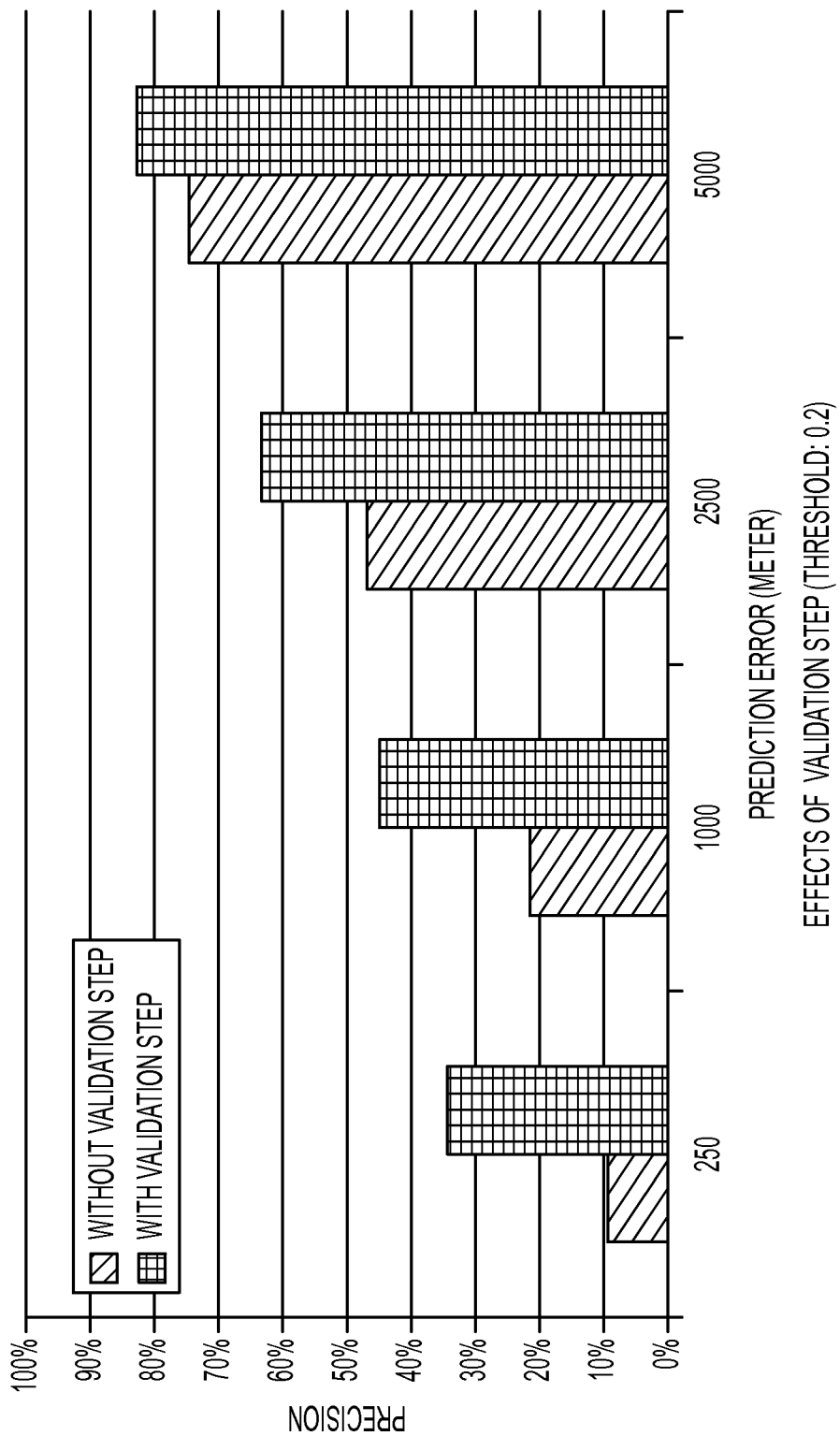

Referring now to an effects of validation step, FIG. 11 shows that the prediction precision can be significantly improved using the validation step. Based on the generated classification model, by filtering out those tweets in which their predicted location does not match their actual location, we can locate more than 30% of predicted tweets within 250 m from their actual location. This result verifies that the prediction framework with the validation step correctly classifies such tweets and so ensures high prediction accuracy.

Figure 13:
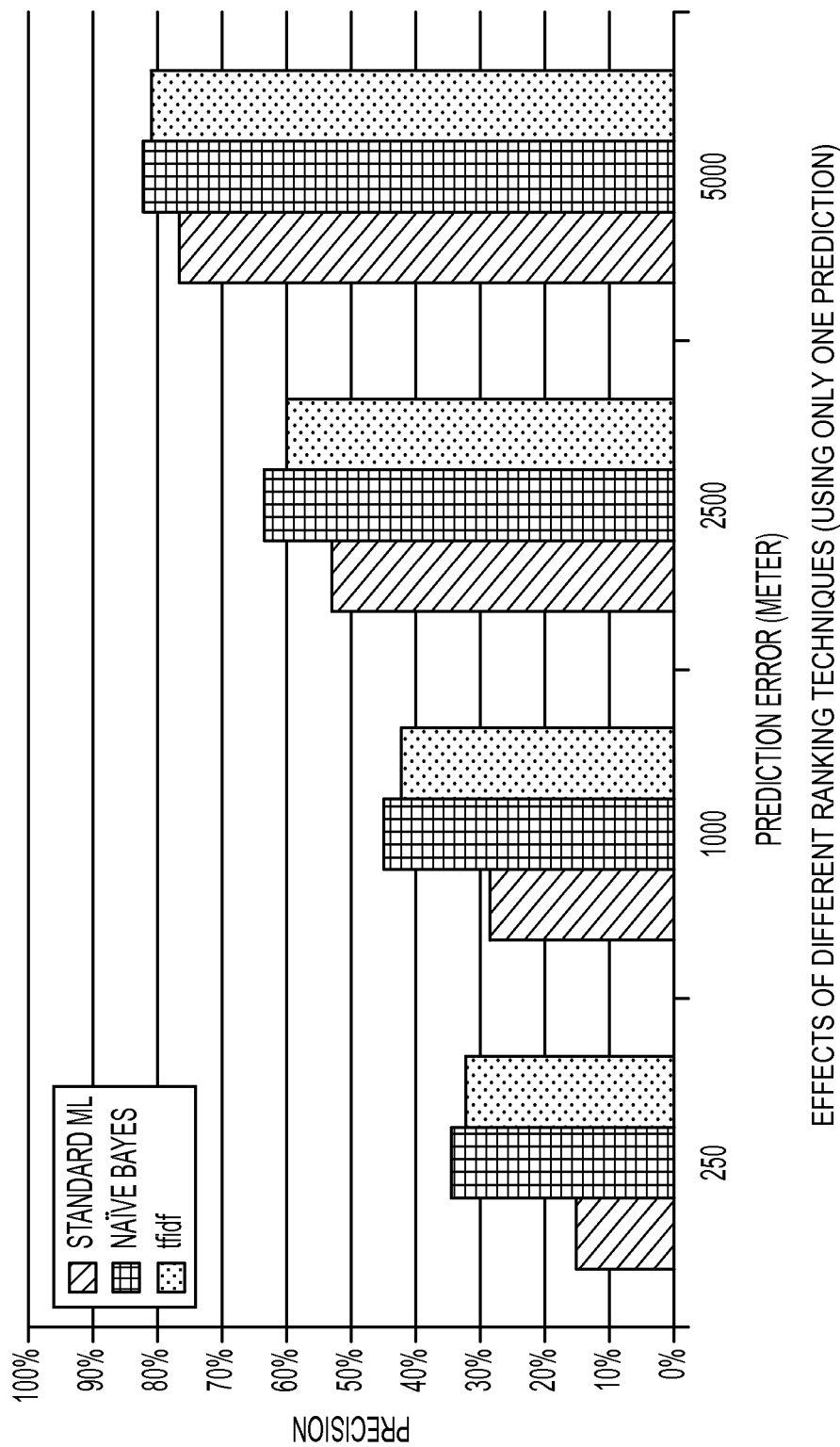
FIGS. 13 and 14 depict example graphs related to effects of different ranking techniques according to an embodiment.
Figure 14:
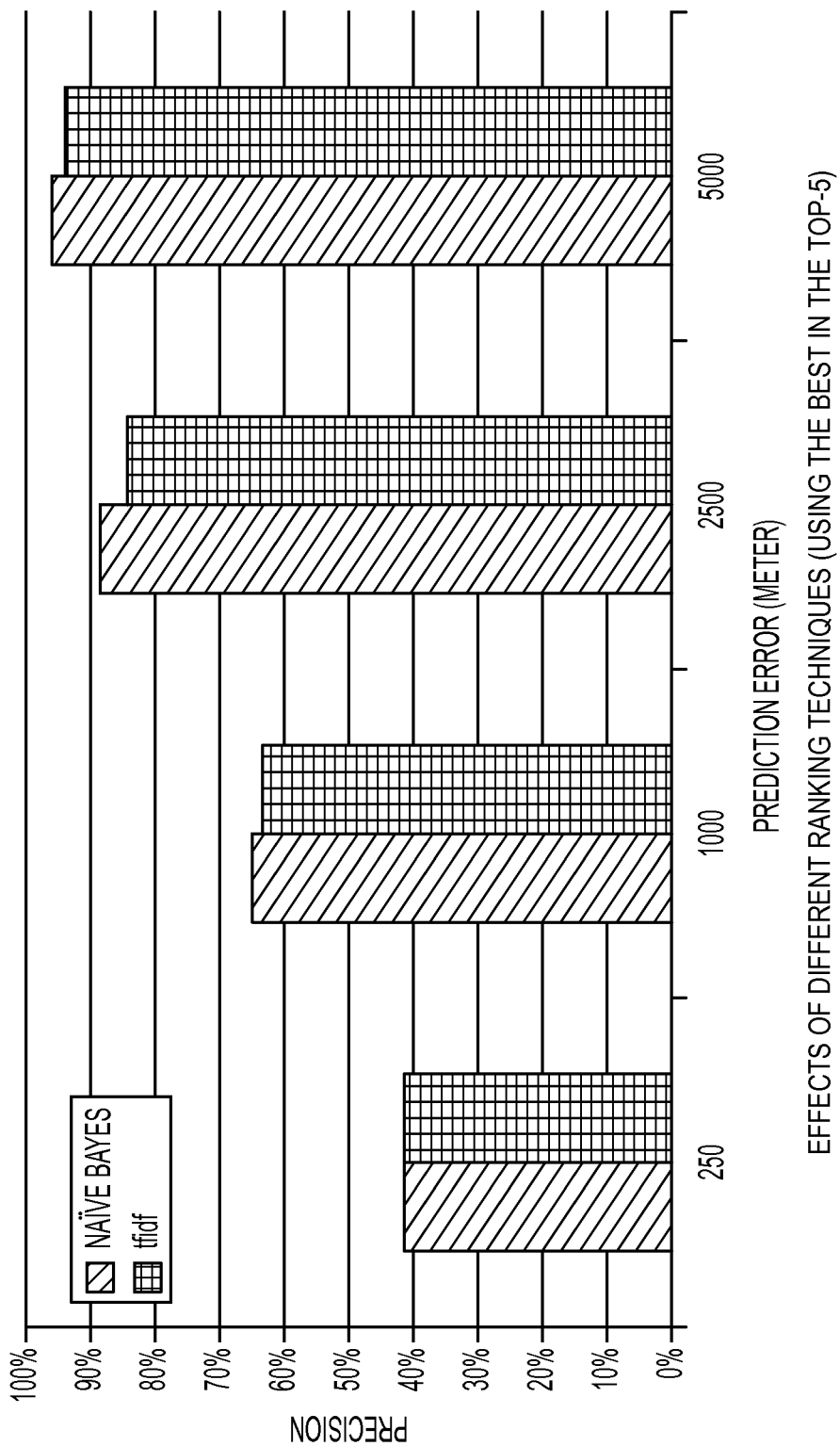

Reference will now be made to the effects of different ranking techniques. FIGS. 13 and 14 show the example prediction precision of three different ranking techniques on 2003 tweets predicted by the framework. Following is a discussion of how 2003 tweets are predicted in the next experiment. FIG. 13 shows that using the naive Bayes model as the ranking technique has better prediction precision than using standard machine learning techniques or t f idf values. Specifically, using the naive Bayes model, about 34.35% and 44.38% of predicted tweets are located within 250 m and 1,000 m respectively from their location. This result shows that the naive Bayes model is working well in the language models to rank locations for given tweets even though the model does not consider global word weights. It is believed that this is because the language models include only location-specific words (i.e. most of general words are filtered out by the local keywords and stop words). This may also be a reason that incorporating global word weights of such location-specific words, like t f idf ranking, does not help much in terms of improving the prediction precision. In comparison, ranking with the standard machine learning (ML) techniques has relatively worse prediction precision because the prediction model is built using a very limited number of FOURSQUARE tips. Since it is almost infeasible to use all (or most of) tips to run standard ML techniques due to the time complexity and the resource (CPU and memory) constraints, it would be hard to get good prediction results using this technique.

FIG. 14 shows the prediction precision using the best prediction (i.e., the closest location from the geo-tag of tweets) in the top-5 predictions. This result represents the capacity of the prediction framework to find a set of good candidate locations even though the first predicted location is mistaken. The result shows that the naive Bayes model also has the best prediction precision by locating 41.99% of predicted tweets within 250 m from their location. The prediction model generated using standard ML techniques has no top-5 result because it returns only one location having the highest confidence. Since the naive Bayes model has the best prediction precision in all other experiments using different parameter values, results are reported using only the naive Bayes model in subsequent discussions.

Figure 16:
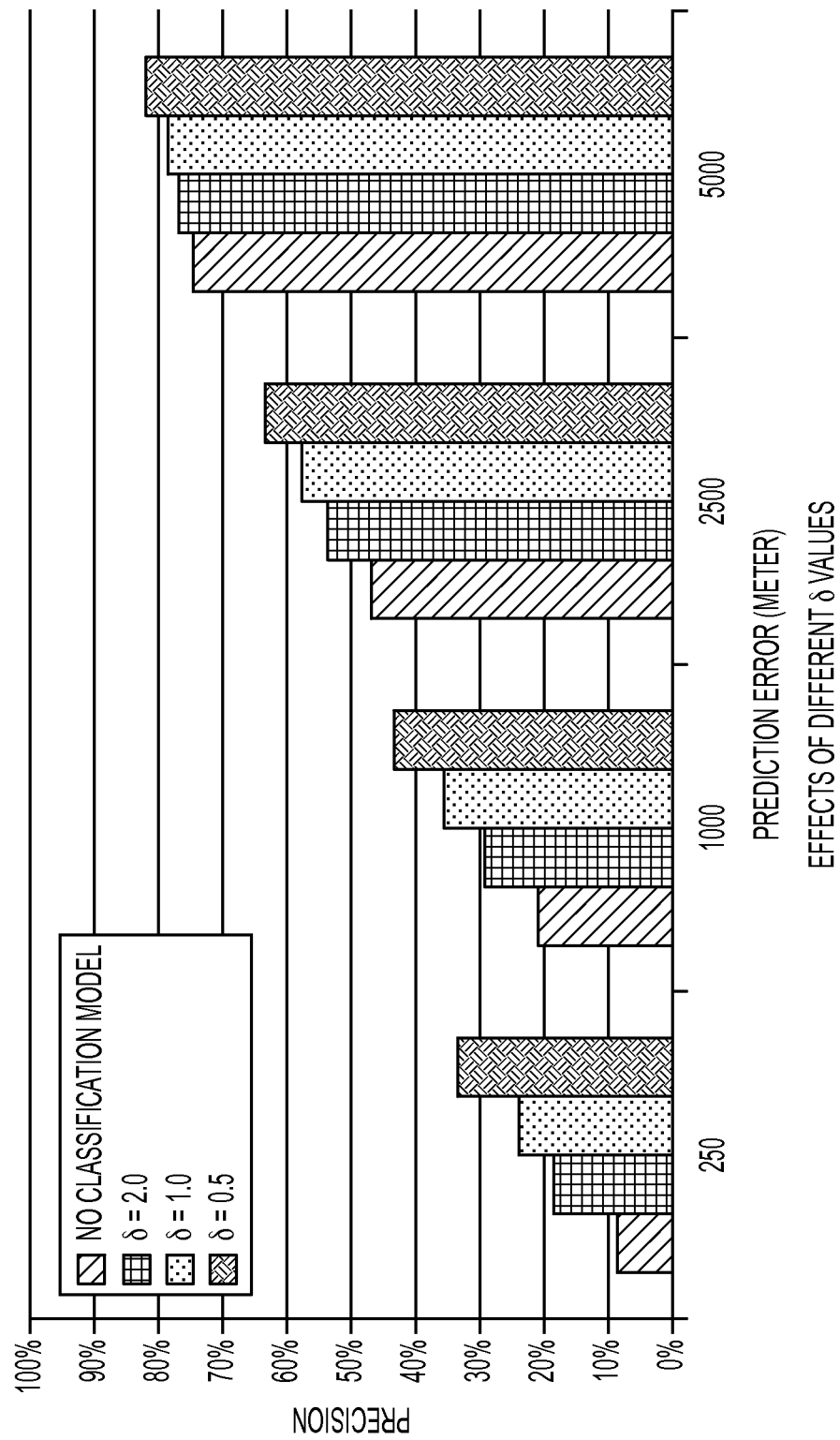
FIGS. 16, 17 and 18 depict example graphs related to effects of different parameter values according to an embodiment (FIG. 16 relates to effects of different δ values.

Referring now to effects of different δ values, compared are the number of tweets, among 15,096 tweets (see the Table of FIG. 9), classified as $l_{ref}=l_{cur}$ by different classification models built using different δ values in the Table of FIG. 15. The percentages in the Table of FIG. 15 show the corresponding ratios among 72,601 target tweets. Since the classification model using 0.5 as the δ value is built using the training set which includes more $l_{ref} \neq l_{cur}$ tweets compared to the other training sets as shown in the Table of FIG. 12, it has more capability to find such tweets and so choose fewer predictable tweets. The prediction precision result below shows that the classification model built using the δ value of 0.5 ensures higher precision by effectively filtering out unpredictable tweets. FIG. 16 shows the prediction precision of the framework without any classification model and with examples of three different classification models using different δ values. The prediction precision increases as the δ value decreases because, as mentioned, the capability to filter out $l_{ref} \neq l_{cur}$ tweets increase due to the higher percentage of $l_{ref} \neq l_{cur}$ tweets in the training set. However, there would be a point in which selecting more tweets for learning the classification model by decreasing the δ value does not improve the prediction precision any more (or even worsens the prediction precision). This is because more noisy tweets which have low confidence in their referred location would be included in the training set by decreasing the δ value.

Figure 17:
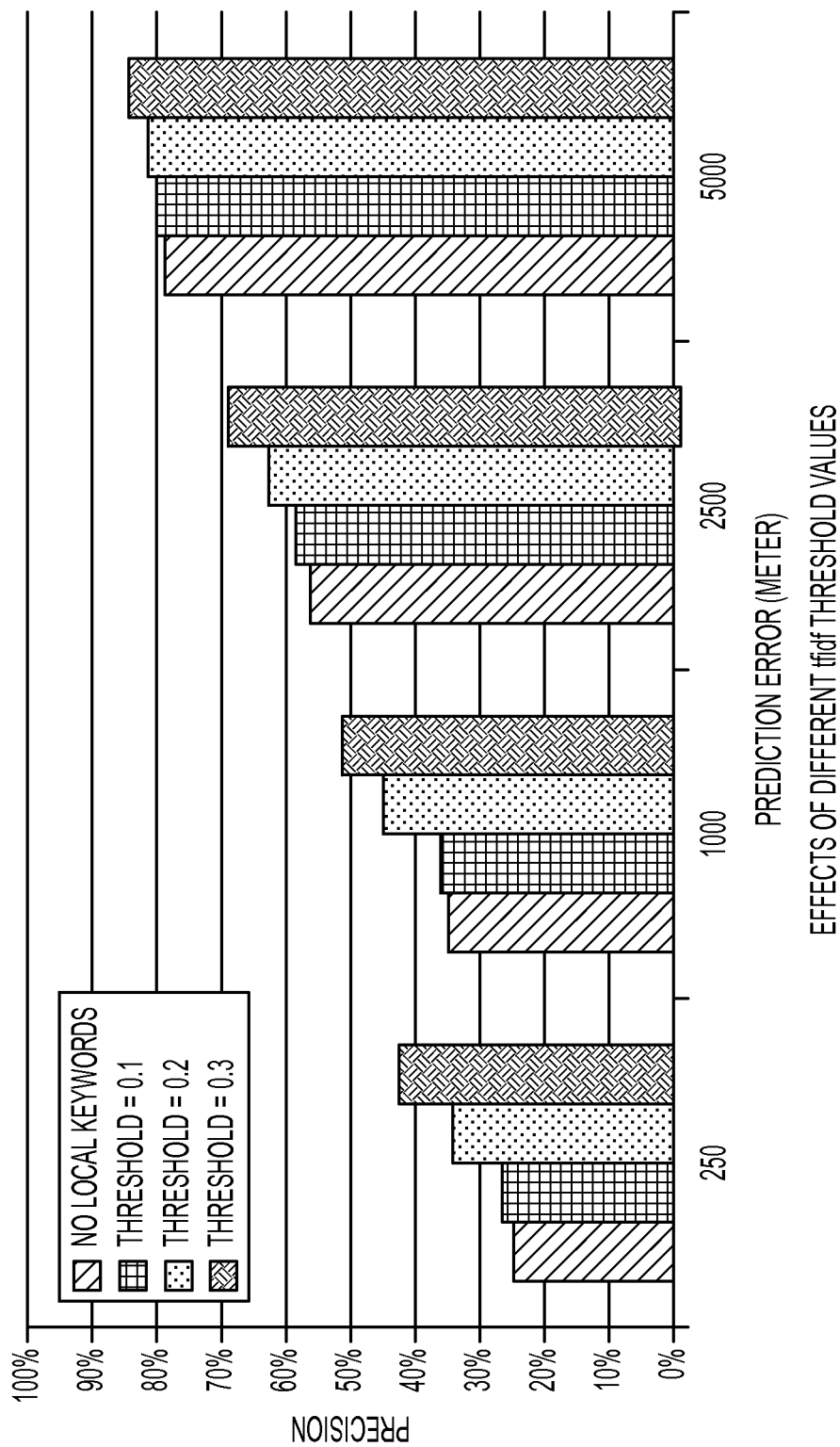

Referring now to effects of different t f idf threshold values FIG. 17 shows the prediction precision of the framework without any local keywords and with three different example t f idf threshold values. Since the number of local keywords decreases as the t f idf threshold values are increased as shown in the Table of FIG. 8, more tweets are filtered out as "I don't know" tweets because tweets should have at least one local keyword not to be excluded. Also, the precision continuously increases because selected tweets by high t f idf threshold for the prediction have unique location-specific keywords. However, there is a trade-off between the prediction precision and the percentage of selected tweets. In other words, if we increase the t f idf threshold to improve the prediction precision, a smaller number of tweets are selected for the prediction.

Figure 18:
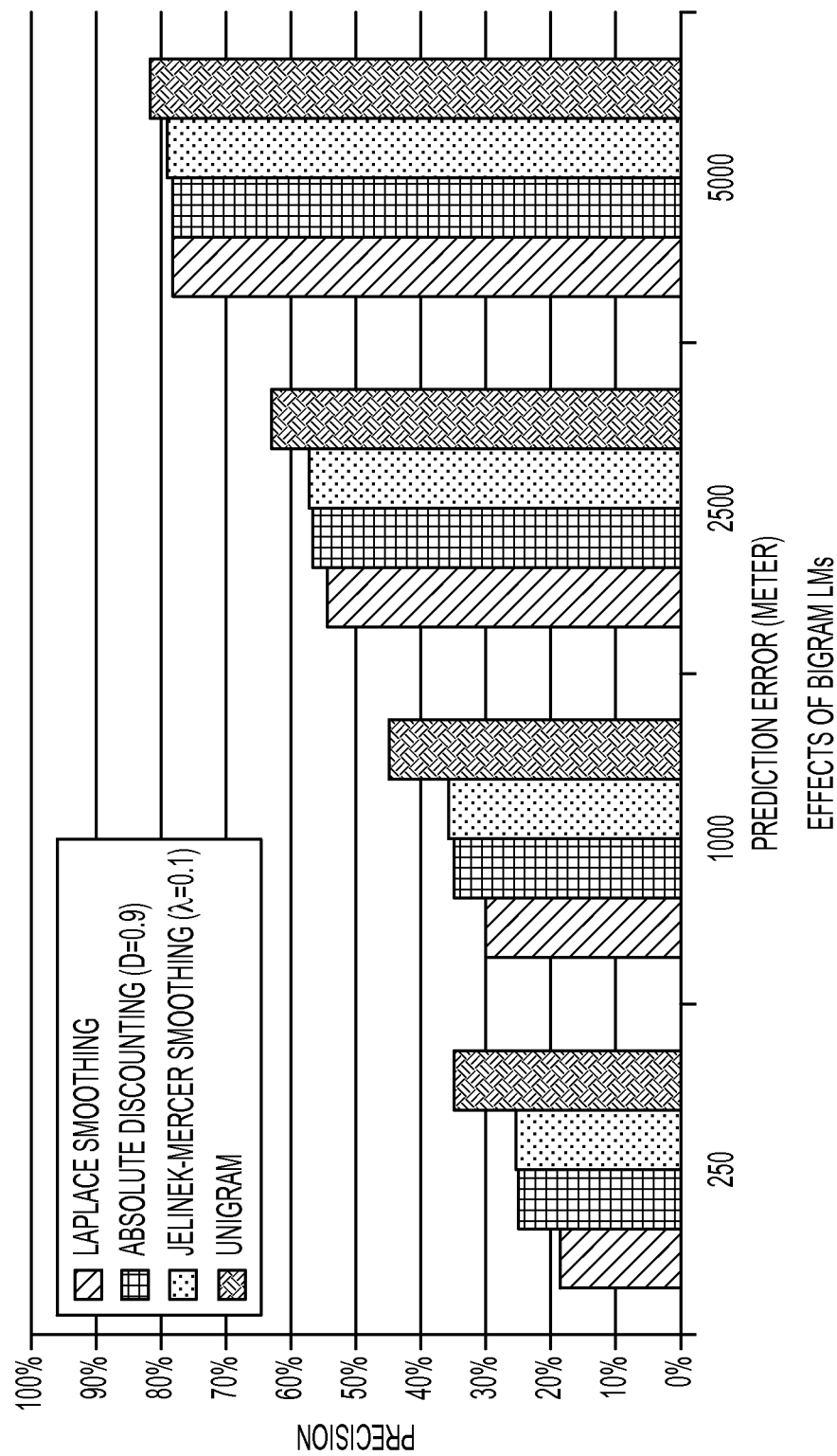

Referring now to Unigram vs Bigram, a comparison of unigram and bigram language models (LMs) under the same conditions is presented. FIG. 18 shows the prediction precision of bigram LMs with three different example smoothing techniques and unigram LMs using the naive Bayes model.

The effective smoothing parameters are selected from a coarse search of the parameter space. The result shows that unigram LMs are more effective than bigram LMs, which is consistent with the reported results (see F. Sebastiani. Machine learning in automated text categorization—ACM Comput. Surv., 34(1):1-47, March 2002). This is because tweets and FOURSQUARE tips are very short messages and it is rarely possible to include a bigram (or trigram or more), which can be used to effectively differentiate one location from another. Even though the location names include two or more words, the examination of prediction results verifies that unigram LMs are sufficient to detect such names. Also the effective parameters of absolute discounting and Jelinek-Mercer smoothing shows that the smoothed bigram LMs work better when they assign more weights on unigram LMs.

Referring now to percentage of geo-tagged tweets, an example summary is presented (see the Table of FIG. 19) of how many tweets are geo-tagged by the prediction framework. This result indicates how well the framework tackles the location sparseness problem of TWITTER. In the original TWITTER data, only 0.72% tweets have their geo-tag. For fair comparison with the framework in which we exclude tweets from FOURSQUARE and INSTAGRAM because it is too trivial to predict their location, the percentage of geo-tagged tweets in the original TWITTER data goes down to 0.58% if we don't count the tweets from FOURSQUARE and INSTAGRAM. Reported here are the results of the framework using the $\delta$ and t f idf threshold value of 0.5 and 0.2 respectively and the naive Bayes model as the ranking technique because it is believed that this setting strikes a balance between the number of geo-tagged tweets and the prediction accuracy. The framework equipped with all proposed techniques including the validation step can geo-tag 2.76% of all tweets, increasing about 4.8 times compared with the percentage of geo-tagged tweets in the original TWITTER data, while ensuring high prediction accuracy. If the classification-based prediction validation method is not used, we can geo-tag 20.79% of all tweets with lower prediction accuracy as shown in the Table of FIG. 9.

Referring now to FIG. 20, a Table related to example text associated with inference of spatio-temporal tags from unstructured text according to an embodiment is shown.

In this regard, we build models from unstructured text at specific locations as follows: (1) Build language model for a given location based on the unstructured text at that location—(a) Handling unstructured texts (e.g. "The seating area says Acela express ticket holders only"); (b) Tokenizing=> [the] [seating] [area] [says] [acela] [express] [ticket] [holders] [only]; (c) Removing stop words=>[seating] [area] [acela] [express] [ticket] [holders]; (d) Stemming=>[seat] [area] [acela] [express] [ticket] [holder]; (2) Select only locations with more than minimum amount of unstructured texts; and (3) Consider only commonly used words for that location.

Figure 21:
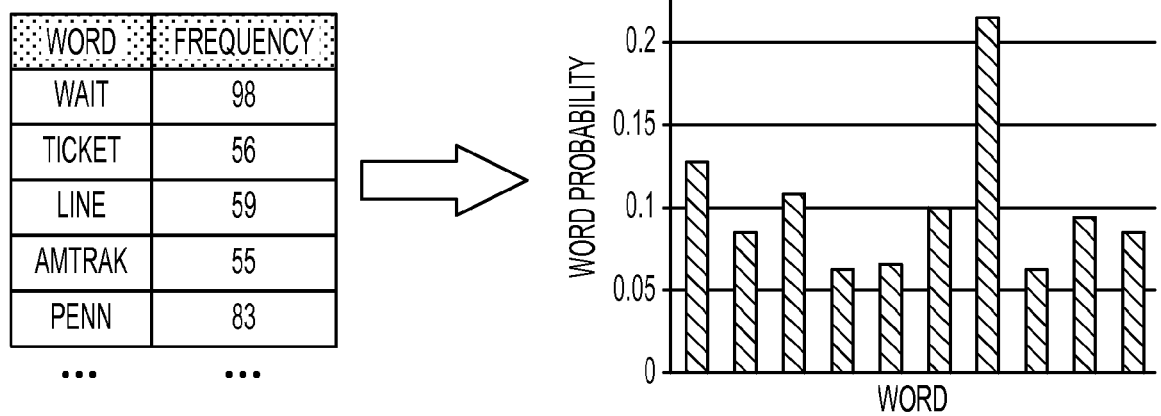
FIG. 21 depicts an example word frequency count and word probability mapping associated with the text of FIG. 20 according to an embodiment.

FIG. 21 depicts an example word frequency count and word probability mapping associated with the text of FIG. 20 according to an embodiment.

Figure 22:
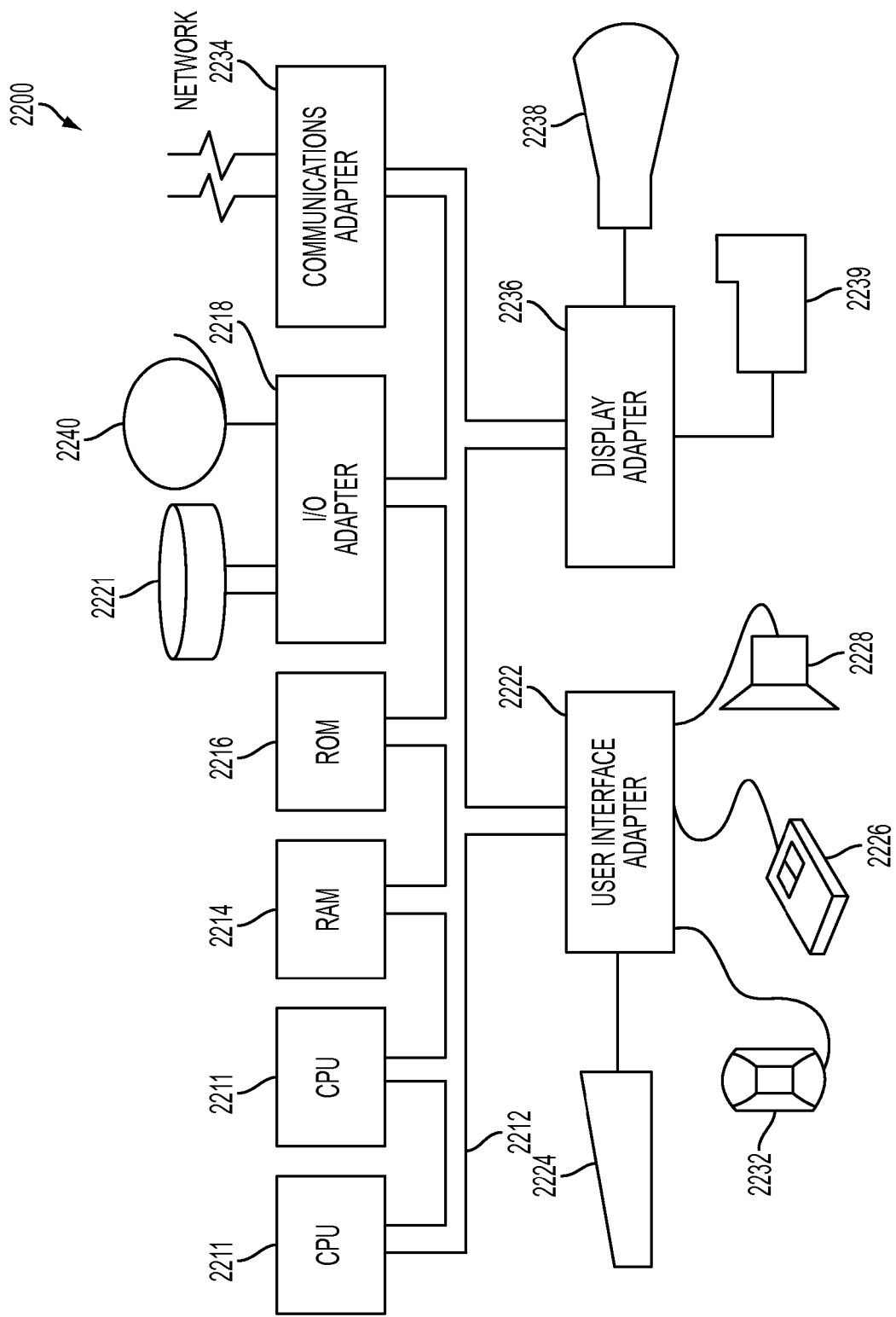
FIG. 22 depicts a block diagram of a system according to an embodiment.

Referring now to FIG. 22, this figure shows a hardware configuration of computing system 2200 according to an embodiment of the present invention. As seen, this hardware configuration has at least one processor or central processing unit (CPU) 2211. The CPUs 2211 are interconnected via a system bus 2212 to a random access memory (RAM) 2014, read-only memory (ROM) 2216, input/output (I/O) adapter 2218 (for connecting peripheral devices such as disk units 2221 and tape drives 2240 to the bus 2212), user interface adapter 2222 (for connecting a keyboard 2224, mouse 2226, speaker 2228, microphone 2232, and/or other user interface device to the bus 2212), a communications adapter 2234 for connecting the system 2200 to a data processing network, the Internet, an Intranet, a local area network (LAN), etc., and a display adapter 2236 for connecting the bus 2212 to a display device 2238 and/or printer 2239 (e.g., a digital printer or the like).

Figure 23:
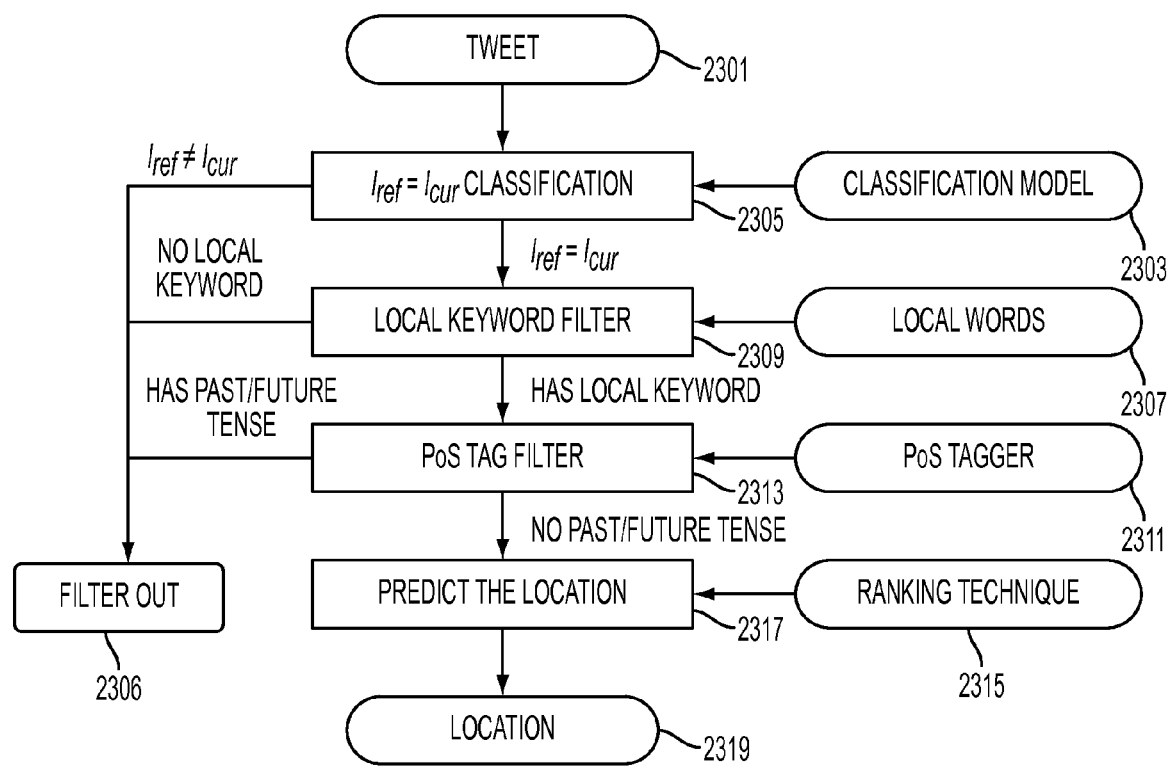
FIG. 23 depicts a block diagram of a method according to an embodiment.

Referring now to FIG. 23, another example implementation is shown. As seen in this Fig., tweet 2301 and classification model 2303 are input to classification step 2305. If $l_{ref} \neq l_{cur}$, then go to step 2306 (filter out). Otherwise, local keywords 2307 are input to local keyword filter step 2309. If no local keyword then go to step 2306 (filter out). Otherwise, PoS tagger 2311 is input to Pos tag filter step 2313. If has past/future tense then go to step 2306 (filter out). Otherwise, ranking technique 2315 is input to Predict the location step 2317 (the output of which is Location 2319).

In one embodiment, a method implemented in a computer system for extracting location information from unstructured text by utilizing a language model and a classifier is provided, the method comprising: obtaining, by a computer, the unstructured text; identifying by the computer, via use of the language model and based upon the received unstructured text, a location referred to by the received unstructured text; and determining by the computer, via use of the classifier, whether the location referred to by the received unstructured text is also a physical location from where the received unstructured text was sent.

In one example, the method further comprises building, by the computer, the language model.

In another example, the language model is built based upon geo-tagged text.

In another example, the method further comprises building, by the computer, a plurality of language models, each of the language models corresponding to a respective location.

In another example, the method further comprises building, by the computer, the classifier.

In another example, the classifier is built based upon a training set of data.

In another example, the method further comprises determining, by the computer, if the received unstructured text is location-neutral.

In another example, if it is determined that the received unstructured text is location-neutral then the identifying the location referred to by the received unstructured text and the determining, via use of the classifier, whether the location referred to by the received unstructured text is also a physical location from where the received unstructured text was sent are not performed.

In another example, the identifying the location referred to by the received unstructured text comprises calculating, by the computer, a degree of confidence that the location referred to is correct.

In another example, the determining whether the location referred to by the received unstructured text is also the physical location from where the received unstructured text was sent comprises calculating, with the computer, a degree of confidence that the location referred to by the received unstructured text is also the physical location from where the received unstructured text was sent.

In another example, the method further comprises outputting, by the computer, at least one of: (a) the location referred to by the received unstructured text; (b) the physical location from where the received unstructured text was sent; and (c) any combination thereof.

In another embodiment, a computer readable storage medium, tangibly embodying a program of instructions executable by the computer for extracting location information from unstructured text by utilizing a language model and a classifier is provided, the program of instructions, when executing, performing the following steps: obtaining the unstructured text; identifying, via use of the language model and based upon the received unstructured text, a location referred to by the received unstructured text; and determining, via use of the classifier, whether the location referred to by the received unstructured text is also a physical location from where the received unstructured text was sent.

In one example, the program of instructions, when executing, further performs building the language model.

In another example, the language model is built based upon geo-tagged text.

In another example, the program of instructions, when executing, further performs building a plurality of language models, each of the language models corresponding to a respective location.

In another example, the program of instructions, when executing, further performs building the classifier.

In another example, the program of instructions, when executing, further performs outputting at least one of: (a) the location referred to by the received unstructured text; (b) the physical location from where the received unstructured text was sent; and (c) any combination thereof.

In another embodiment, a computer-implemented system for extracting location information from unstructured text by utilizing a language model and a classifier is provided, the system comprising: an input element configured to receive the unstructured text; an identifying element configured to identify, via use of the language model and based upon the received unstructured text, a location referred to by the received unstructured text; a determining element configured to determine, via use of the classifier, whether the location referred to by the received unstructured text is also a physical location from where the received unstructured text was sent; and an output element configured to output the determination of whether the location referred to by the received unstructured text is also the physical location from where the received unstructured text was sent.

In one example, the system comprises a first building element configured to build the language model.

In another example, the language model is built based upon geo-tagged text.

In another example, the first building element is configured to build a plurality of language models, each of the language models corresponding to a respective location.

In another example, the system further comprises a second building element configured to build the classifier.

In another example, the output element is further configured to output at least one of: (a) the location referred to by the received unstructured text; (b) the physical location from where the received unstructured text was sent; and (c) any combination thereof.

In another embodiment, a method implemented in a computer system for extracting location information from unstructured text by utilizing a language model and a classifier is provided, the method comprising: building, by a computer, the language model; building, by the computer, the classifier; obtaining, by the computer, the unstructured text; identifying by the computer, via use of the language model and based upon the received unstructured text, a location referred to by the received unstructured text; determining by the computer, via use of the classifier, whether the location referred to by the received unstructured text is also a physical location from where the received unstructured text was sent; and outputting, by the computer, at least one of: (a) the location referred to by the received unstructured text; (b) the physical location from where the received unstructured text was sent; and (c) any combination thereof.

In one example, the language model is built based upon geo-tagged text.

In other examples, any steps described herein may be carried out in any appropriate desired order.

As described herein, various embodiments operate in the context of: (a) mobile and wireless networking; and/or telecommunications.

As described herein, various embodiments operate using programmed heuristics (e.g., geo-tagging heuristics). In one specific example, various embodiments operate using programmed heuristics to distinguish between physical location and referred location.

As described herein, various embodiments operate in the context of: (a) Smarter Planet: Cities; (b) Smarter Planet: Transportation; (c) Software: Information and data management; and/or (d) Web Technology: Wireless.

As described herein, various embodiments operate in the context of social networking services that are integrated with mobile devices including various sensing capabilities (such as to provide, for example, spatio-temporal data).

As described herein, given the lack of explicit spatial tags in several unstructured text-based social network feeds, various embodiments provide for deriving fine-grained location information from such unstructured text.

As described herein, various embodiments operate in the context of a supervised classification approach.

As described herein, various embodiments may provide filtering and data cleaning (e.g., stemmer, stop-words, frequency, short-URLs).

As described herein, various embodiments infer spatial and/or temporal attributes in unstructured text.

As described herein, various embodiments may be integrated with a spatio-temporal toolkit.

As described herein, various embodiments may be used in connection with: geographical surveys (e.g., election surveys, shop placement surveys), spatio-temporal localization of events, geo-spatial opinion mining, and/or any other desired statistical applications.

As described herein, various embodiments may be used in connection with surveillance (e.g., track individuals at a fine granularity given various data sources (e.g., unstructured text, cell-id location information)).

As described herein, various embodiments may be used in connection with combined multiple data sources for spatio-temporal tag inferences.

As described herein a multi-source and multi-model based inference framework used for location prediction can significantly increase the percentage of tweets that can be geotagged automatically at a fine granularity of locations with high accuracy.

As described herein, various embodiments provide algorithms for geotagging, comprising: Step 1: Filtering out general "I don't know" unstructured texts using heuristics (a) Ignoring unstructured texts having no clue for their location; (b) If a text doesn't have any local keyword, we classify the text as a "I don't know" text—e.g. "This sun is BLAZING and there's no shade."; Step 2: Predict the location of selected unstructured texts (a) By ranking locations based on generated language models and a given unstructured text; (b) Use of t fidf and perplexity metrics to predict locations (from unstructured text); Step 3: Differentiating the referred location of unstructured texts and their physical location, examples: (Example 1) "I hope you all have a GREAT weekend but also take time to remember those we've lost; those who are still fighting for our freedom! !" Referred location: World Trade Center; (Example 2) "Let's Go Yankees!!!" Referred location: Yankees Stadium.

As described herein, the location sparseness problem of tweets has been addressed in various embodiments by a framework for predicting the fine-grained location of each tweet using only textual content of the tweet. Such framework may be vital for many applications (such as may run on smart phones) which require geo-tagged tweets such as location-based advertisements, entertainments and tourism. The prediction framework provides various unique features, including: (a) build the probabilistic language models for locations using unstructured short messages that are tightly coupled with their locations (e.g., semantic locations) in FOURSQUARE and utilize ranking techniques to select the best candidate location as the predicted location for a tweet; (b), develop a set of location-aware filters (e.g., text analysis) that can remove as many location-neutral tweets as possible to minimize the noise level and improve the accuracy of the location prediction models; (c), develop a classification-based prediction validation method to ensure the correctness of predicted locations (e.g., referred location and actual location where tweet was written). Experimental results show that the framework can increase the percentage of geo-tagged tweets about 5 times compared to the original TWITTER data while ensuring high prediction accuracy by locating 34% of predicted tweets within 250 meters from their location. Various examples incorporate an external data source such as FOURSQUARE, in addition to TWITTER data, for location prediction of each tweet. Furthermore, unlike some conventional mechanisms which focus on coarse-grained prediction (such as 10 km and 100 km), various embodiments ensure high prediction accuracy at a fine granularity by locating a considerable amount of predicted tweets within one-quarter kilometer from their location.

As described herein are mechanisms related to location-specific information explicitly or implicitly included in the textual content of tweets. The framework described can be easily extended by incorporating more information sources to further improve the location prediction accuracy. One extension would be to build time-based models (e.g., per day, week, month and year) for each location and then utilize the models with the timestamp of a given tweet to predict its location. For example, if the time-based models for a museum indicate that there is almost no activity after 6 pm on weekdays, the prediction framework would give very low ranking to the museum for a tweet which was posted at 9 pm on a Wednesday. Another extension would be to consider a set of tweets, including FOURSQUARE check-in tweets, posted by a single user as time series data. This information could be used to fine-tune the prediction of the framework. For example, if a user posted a FOURSQUARE check-in tweet, we can reduce the search space for predicting the location of those tweets, posted by the same user and whose timestamp is close to that of the FOURSQUARE tweet. Furthermore, if a user posted two FOURSQUARE check-in tweets at two different locations within a short period of time, we could predict the location of those tweets posted between the two timestamps of the FOURSQUARE tweets by analyzing the possible trajectory paths between the two locations using some interpolation techniques, like a route matching algorithm (see A. Thiagarajan, J. Biagioni, T. Gerlich, and J. Eriksson. Cooperative transit tracking using smart-phones—in SenSys 2010). Other extensions to the framework include inference over future and past activities included in the tweets, utilizing social relationships between TWITTER users, spatial and temporal relationship as well as semantic relationship among different tweets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for extracting location information from unstructured text by utilizing a language model and a classifier, the method comprising:
obtaining, by a computer, the unstructured text;
identifying by the computer, via use of the language model and based upon the received unstructured text, a location referred to by the received unstructured text; and
determining by the computer, via use of the classifier, whether the location referred to by the received unstructured text is also a physical location from where the received unstructured text was sent;
wherein the language model is based upon a source of data that is distinct from the unstructured text.

2. The method of claim 1, further comprising building, by the computer, the language model.

3. The method of claim 2, wherein the language model is built based upon geo-tagged text.

4. The method of claim 2, further comprising building, by the computer, a plurality of language models, each of the language models corresponding to a respective location.

5. The method of claim 1, further comprising building, by the computer, the classifier.

6. The method of claim 5, wherein the classifier is built based upon a training set of data.

7. The method of claim 1, further comprising determining, by the computer, if the received unstructured text is location-neutral.

8. The method of claim 7, wherein, if it is determined that the received unstructured text is location-neutral then the identifying the location referred to by the received unstructured text and the determining, via use of the classifier, whether the location referred to by the received unstructured text is also a physical location from where the received unstructured text was sent are not performed.

9. The method of claim 1, wherein the identifying the location referred to by the received unstructured text comprises calculating, by the computer, a degree of confidence that the location referred to is correct.

10. The method of claim 1, wherein the determining whether the location referred to by the received unstructured text is also the physical location from where the received unstructured text was sent comprises calculating, with the computer, a degree of confidence that the location referred to by the received unstructured text is also the physical location from where the received unstructured text was sent.

11. The method of claim 1, further comprising outputting, by the computer, at least one of: (a) the location referred to by the received unstructured text; (b) the physical location from where the received unstructured text was sent; and (c) any combination thereof.

12. A computer readable storage medium, tangibly embodying a program of instructions executable by the computer for extracting location information from unstructured text by utilizing a language model and a classifier, the program of instructions, when executing, performing the following steps:
obtaining the unstructured text;
identifying, via use of the language model and based upon the received unstructured text, a location referred to by the received unstructured text; and determining, via use of the classifier, whether the location referred to by the received unstructured text is also a physical location from where the received unstructured text was sent;

wherein the language model is based upon a source of data that is distinct from the unstructured text.

13. The computer readable storage medium of claim 12, wherein the program of instructions, when executing, further performs building the language model.

14. The computer readable storage medium of claim 13, wherein the language model is built based upon geo-tagged text.

15. The computer readable storage medium of claim 13, wherein the program of instructions, when executing, further performs building a plurality of language models, each of the language models corresponding to a respective location.

16. The computer readable storage medium of claim 12, wherein the program of instructions, when executing, further performs building the classifier.

17. The computer readable storage medium of claim 12, wherein the program of instructions, when executing, further performs outputting at least one of: (a) the location referred to by the received unstructured text; (b) the physical location from where the received unstructured text was sent; and (c) any combination thereof.

18. A computer-implemented system for extracting location information from unstructured text by utilizing a language model and a classifier, the system comprising:

an input element configured to receive the unstructured text;

an identifying element configured to identify, via use of the language model and based upon the received unstructured text, a location referred to by the received unstructured text;

a determining element configured to determine, via use of the classifier, whether the location referred to by the received unstructured text is also a physical location from where the received unstructured text was sent; and an output element configured to output the determination of whether the location referred to by the received unstructured text is also the physical location from where the received unstructured text was sent;

wherein the language model is based upon a source of data that is distinct from the unstructured text.

19. The system of claim 18, further comprising a first building element configured to build the language model.

20. The system of claim 19, wherein the language model is built based upon geo-tagged text.

21. The system of claim 19, wherein the first building element is configured to build a plurality of language models, each of the language models corresponding to a respective location.

22. The system of claim 18, further comprising a second building element configured to build the classifier.

23. The system of claim 18, wherein the output element is further configured to output at least one of: (a) the location referred to by the received unstructured text; (b) the physical location from where the received unstructured text was sent; and (c) any combination thereof.

24. A method implemented in a computer system for extracting location information from unstructured text by utilizing a language model and a classifier, the method comprising:

building, by a computer, the language model;

building, by the computer, the classifier;

obtaining, by the computer, the unstructured text;

identifying by the computer, via use of the language model and based upon the received unstructured text, a location referred to by the received unstructured text;

determining by the computer, via use of the classifier, whether the location referred to by the received unstructured text is also a physical location from where the received unstructured text was sent; and outputting, by the computer, at least one of: (a) the location referred to by the received unstructured text; (b) the physical location from where the received unstructured text was sent;

and (c) any combination thereof;

wherein the language model is based upon a source of data that is distinct from the unstructured text.

25. The method of claim 24, wherein the language model is built based upon geo-tagged text.

* * * * *